US012657783B1

(12) United States Patent
Islam et al.

(10) Patent No.: US 12,657,783 B1
(45) Date of Patent: Jun. 16, 2026

(54) SYSTEM AND METHOD FOR LABEL-PRESERVING DATA AUGMENTATION WITH DIFFUSION MODELS

(71) Applicant: Mohamed bin Zayed University of Artificial Intelligence, Abu Dhabi (AE)

(72) Inventors: Khawar Islam, Abu Dhabi (AE); Muhammad Zaigham Zaheer, Abu Dhabi (AE); Arif Mahmood, Lahore (PK); Karthik Nandakumar, Abu Dhabi (AE)

(73) Assignee: Mohamed bin Zayed University of Artificial Intelligence, Abu Dhabi (AE)

( * ) Notice: Subject to any disclaimer, the term of this patent is extended or adjusted under 35 U.S.C. 154(b) by 0 days.

(21) Appl. No.: 19/425,564

(22) Filed: Dec. 18, 2025

Related U.S. Application Data

(60) Provisional application No. 63/777,333, filed on Mar. 25, 2025.

(51) Int. Cl.
G06T 11/00 (2026.01)

(52) U.S. Cl.
CPC ................................... G06T 11/00 (2013.01)

(58) Field of Classification Search
CPC ...................................................... G06T 11/00
See application file for complete search history.

(56) References Cited

U.S. PATENT DOCUMENTS

| | | | |
|---|---|---|---|
| 2018/0234671 A1* | 8/2018 | Yang | G06T 15/205 |
| 2022/0222776 A1* | 7/2022 | Porikli | G06T 5/20 |
| 2022/0230282 A1* | 7/2022 | Zhang | G06V 10/993 |
| 2023/0124252 A1* | 4/2023 | Liu | G06T 5/77 |
| | | | 345/589 |
| 2024/0169622 A1* | 5/2024 | Xie | G06T 11/10 |

(Continued)

FOREIGN PATENT DOCUMENTS

| | | | | |
|---|---|---|---|---|
| CN | 117635883 A * | 3/2024 | | G06N 3/094 |
| CN | 117635883 B | 5/2024 | | |
| CN | 119579439 A * | 3/2025 | | G06T 5/70 |

OTHER PUBLICATIONS

CN-119579439-A (Machine Translation on Feb. 20, 2026) (Year: 2025).*

(Continued)

*Primary Examiner* — Michael Le
(74) *Attorney, Agent, or Firm* — Oblon, McClelland, Maier & Neustadt, L.L.P.

(57) ABSTRACT

A data augmentation method and system for generating enriched training images using diffusion models, hybrid concatenation, and fractal blending. An original image and at least one prompt are input to a diffusion model to generate a corresponding image. A hybrid image is formed by concatenating a portion of the original image with a remaining portion of the generated image, wherein concatenation is performed using a binary pixel-wise mask. The mask comprises pixels valued at zero or one, with at least one entire row or column set to zero. The concatenation includes multiplying pixels of the original image with the mask and multiplying pixels of the generated image with the complement of the mask. A fractal image is blended into the hybrid image using a blending factor to produce an augmented image.

16 Claims, 15 Drawing Sheets

(56) References Cited

U.S. PATENT DOCUMENTS

2025/0111565 A1*  4/2025  Epstein ................... G06T 11/60
2025/0166136 A1*  5/2025  Matthews ................. G06T 5/70

OTHER PUBLICATIONS

CN-117635883-A (Machine Translation on Feb. 21, 2026) (Year: 2024).*
Khawar Islam, et al., "GenMix: Effective Data Augmentation with Generative Diffusion Model Image Editing", arXiv, arXiv:2412.02366v3 [cs.CV], Dec. 6, 2024, 14 pages.

* cited by examiner (a) Autumnal Fractal Patterns    (b) Winter Wonderland    (c) Sunset Hues    (d) Ukiyo-e Inspired Fractal    (e) Autumn Reimagined (f) Snowflake Elegance    (g) Dusk's Fractal Canvas    (h) East Meets West    (i) Seasonal Shifts    (j) Frozen Fractal Patterns (a) 737-200    (b) 727-200    (c) 737-700    (d) 777-200    (e) A330-300

(f) 737-200 Sunset    (g) 727-200 Autumn    (h) 737-700 Snowy    (i) 777-200 Ukiyo    (j) A330-300 Autumn 602b 604b (a) Poinsettia  (b) Barberton Daisy  (c) Gazania  (d) Dandelion  (e) Magnolia (f) Poinsettia Autumn  (g) Barberton Daisy Snowy  (h) Gazania Crayon Sketch  (i) Dandelion Crayon Sketch  (j) Magnolia Crayon Sketch 602d 604d (a) Top-1 Accuracy (%)

(b) Top-5 Accuracy (%)

SYSTEM AND METHOD FOR LABEL-PRESERVING DATA AUGMENTATION WITH DIFFUSION MODELS

CROSS-REFERENCE TO RELATED APPLICATIONS

The present application claims the benefit of U.S. Provisional Application No. 63/777,333, "Diffusemix: Label-Preserving Data Augmentation with Diffusion Models" filed on Mar. 25, 2025, which is incorporated herein by reference in its entirety.

STATEMENT OF PRIOR DISCLOSURE BY AN INVENTOR

Aspects of the present disclosure are described in Khawar Islam, Muhammad Zaigham Zaheer, Arif Mahmood, and Karthik Nandakumar. "Diffusemix: Label-preserving data augmentation with diffusion models." In *Proceedings of the IEEE CVF Conference on Computer Vision and Pattern Recognition*, pp. 27621-27630. 2024 which is incorporated herein by reference in its entirety.

BACKGROUND

Field of the Invention

The present disclosure relates to data augmentation, and, in particular, to a system and method for label-preserving data augmentation with diffusion models.

Description of Related Art

The background description provided herein is for the purpose of generally presenting the context of the disclosure. The work of the presently named inventors, to the extent the work is described in this background section, as well as aspects of the description that may not otherwise qualify as prior art at the time of filing, are neither expressly nor impliedly admitted as prior art against the present disclosure.

Data augmentation is a widely adopted strategy in machine learning for enhancing the diversity of training datasets. In scenarios where labeled data is limited or unbalanced, data augmentation helps prevent overfitting and enables better generalization to unseen samples. By synthetically creating variations of existing training data, machine learning models are better exposed to a range of input conditions. Traditional data augmentation techniques include geometric transformations such as rotation, flipping, scaling, cropping, translation, and affine distortion. These methods modify existing images without altering their underlying semantics and are commonly used across classification, detection, and segmentation tasks.

More recently, augmentation methods based on image mixing have gained prominence, especially in the context of deep learning. These techniques combine two or more images, often from different classes, and their corresponding labels to synthesize new training samples. For example, mixup creates interpolated images by computing the weighted average of pixel values and labels from two input images. CutMix replaces a random rectangular region of one image with a patch from another image. AugMix generates composite images by applying random augmentation chains and combining their results. SaliencyMix attempts to preserve salient content by pasting important image regions from one image onto the context of another. PuzzleMix incorporates saliency and local statistical priors to guide patch-based combinations. Manifold Mixup interpolates latent representations of input samples in the hidden layers of neural networks.

While image mixing methods have demonstrated improved generalization in classification models, they present several challenges. First, random mixing may occlude or distort critical semantic regions, resulting in the loss of important features. Second, such methods often generate ambiguous labels due to the combination of samples from different classes. Third, saliency-guided variants rely on saliency detection algorithms, which are computationally expensive and not always reliable. Despite attempts to address these limitations, existing methods that combine natural images continue to face difficulties in preserving both semantic fidelity and contextual diversity.

Recent advancements in generative modelling have led to the adoption of diffusion models for image synthesis. Diffusion models use a denoising process to generate high-quality images from noise, conditioned on various inputs such as textual prompts. These models have shown promise in creative content generation, data synthesis, and visual storytelling. Various experiments have been performed to investigate the use of diffusion-generated images to augment training data for classification tasks. Experiments particularly focused on analysing the impact of text-to-image diffusion models in classification on the ImageNet dataset, whether diffusion models could generate semantically rich training samples to improve classifier robustness, the use of diffusion-based augmentation for knowledge distillation without real images, and such.

However, existing research has shown that directly training models on diffusion-generated images does not consistently improve performance. In some cases, the performance even degrades when compared to training without any augmentation. This degradation is attributed to the sensitivity of diffusion models to input prompts, which may result in generated content that deviates significantly from the distribution of the original data. When the prompt specification is weak or misaligned, the resulting images may introduce unnatural textures, scenes, or objects. Such deviation compromises the integrity of the training data and leads to overfitting or poor generalization. Furthermore, diffusion models offer limited control over composition, shape, and structure of the generated content, making them unreliable for training purposes without additional safeguards.

Some prior techniques have attempted to mitigate these issues by combining generated images with natural images. For example, PixMix incorporates fractal and feature visualization images with real inputs to improve robustness. However, these approaches do not explicitly control which parts of the generated image are retained or how they are combined with the original. Moreover, the lack of structured integration between natural and generated content limits the ability to preserve semantic relevance while introducing visual diversity.

US Patent Publication No. US2023/0244427A1 describes a system for training classifiers using synthetic data from diffusion models but does not address the problem of prompt sensitivity or contextual blending. US Patent Publication No. US2023/0315790A1 discloses augmentation of vision transformer models using synthetic data derived from prompts but lacks integration with real images or structural enhancement using fractal images. Both references illustrate the use of generative augmentation but fail to ensure semantic control and robust integration for practical training applications.

Conventional data augmentation techniques, including both geometric transformations and generative approaches, are constrained by limited diversity, loss of salient information, label ambiguity, and lack of control over generated content. The absence of a framework that enables precise integration of generated and real content, while introducing structural diversity, continues to hinder the effectiveness of augmentation strategies.

Accordingly, there remains a need for a data augmentation method and system that can generate visually diverse training images while preserving semantic integrity. Specifically, there exists a need for an approach that overcomes the limitations associated with image mixing and diffusion-based augmentation by providing controlled integration of original and generated image content, reducing dependence on prompt sensitivity, and introducing structural complexity to mitigate overfitting.

SUMMARY

In an exemplary embodiment, a data augmentation method is disclosed. The method comprises inputting an original image and at least one prompt to a diffusion model to obtain a generated image. A portion of the original image is concatenated with a portion of the generated image that corresponds to a rest of the original image to form a hybrid image. A fractal image is then blended into the hybrid image with a blending factor to obtain an augmented image. The portion of the original image is concatenated with the portion of the generated image using a mask and a pixel-wise multiplication operation. The mask comprises a plurality of pixels that correspond to pixels of the original image and pixels of the generated image. Each of the pixels of the mask may be either zero or one. The pixel-wise multiplication operation includes multiplying the pixels of the original image with the respective pixels of the mask and multiplying the pixels of the generated image with respective pixels of a complement of the mask. At least one row or at least one column of the pixels of the mask are all zero.

In another exemplary embodiment, a data augmentation system is disclosed. The system comprises circuitry configured to receive an original image and at least one prompt to a diffusion model to obtain a generated image. The circuitry is further configured to concatenate a portion of the original image with a portion of the generated image that corresponds to a rest of the original image to form a hybrid image, and to blend a fractal image into the hybrid image with a blending factor to obtain an augmented image. The circuitry is configured to concatenate the portion of the original image with the portion of the generated image using a mask and a pixel-wise multiplication operation. The mask comprises a plurality of pixels that correspond to pixels of the original image and pixels of the generated image. Each of the pixels of the mask is either zero or one. The pixel-wise multiplication operation includes multiplying the pixels of the original image with the respective pixels of the mask and multiplying the pixels of the generated image with respective pixels of a complement of the mask. At least one row or at least one column of the pixels of the mask are all zero.

BRIEF DESCRIPTION OF THE DRAWINGS

Various embodiments of this disclosure that are provided as examples will be described in detail with reference to the following figures, wherein like numerals reference like elements, and wherein.

DETAILED DESCRIPTION

Figure 1:
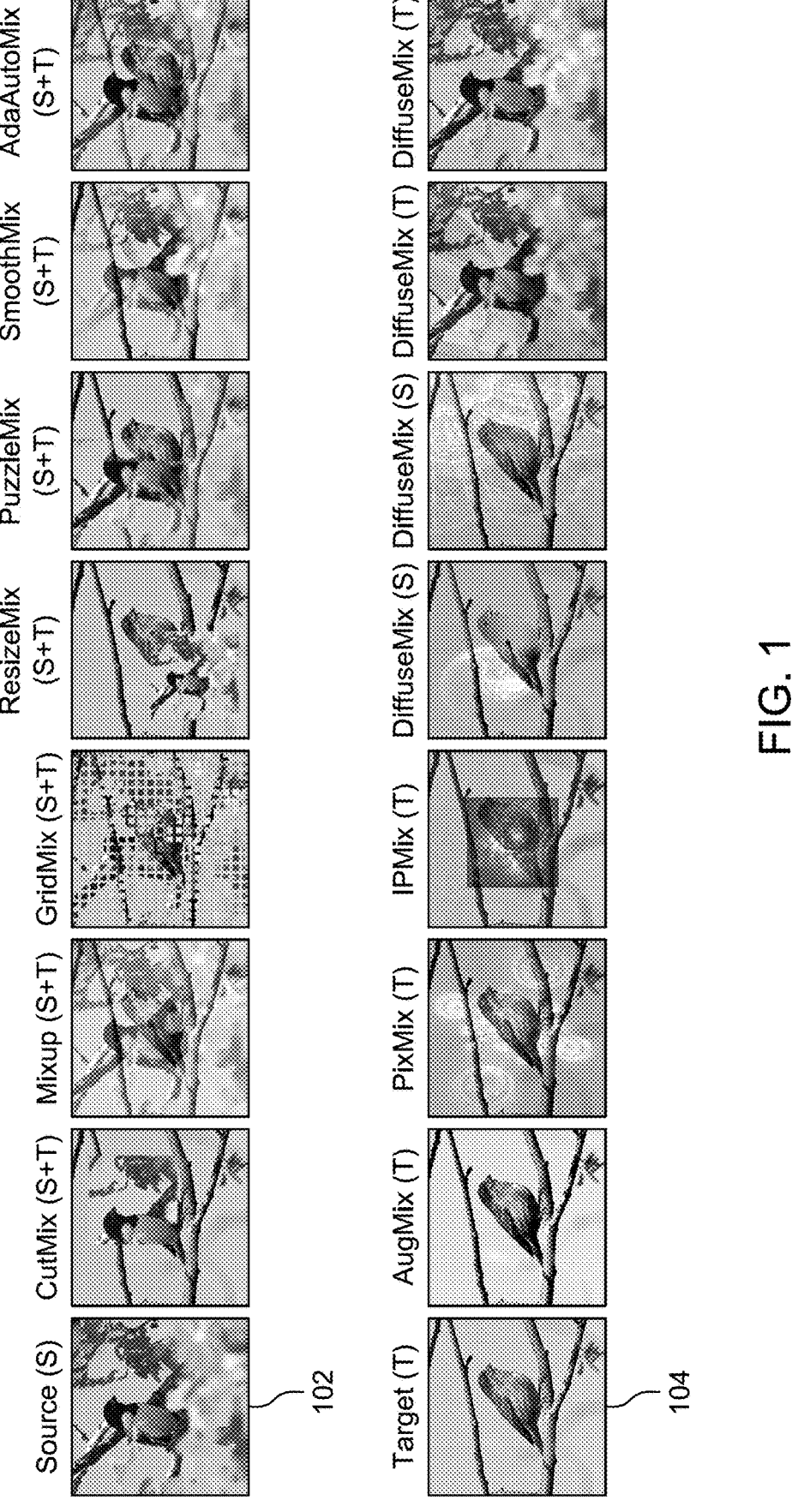
FIG. 1 illustrates comparative visualization of various data augmentation techniques, according to some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "top," "bottom," "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The order of discussion of the different steps described herein has been presented for clarity sake. In general, these steps can be performed in any suitable order. Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

FIG. 1 illustrates a comparative visualization of various data augmentation techniques applied to input images from distinct source and target domains. An upper row 102 corresponds to augmentation results based on source images (S), while a lower row 104 corresponds to augmentation outcomes for target images (T). In the upper row 102, the source image is first presented, followed by images generated using established mixup-based techniques including CutMix, Mixup, GridMix, ResizeMix, PuzzleMix, Smooth-Mix, and AdaAutoMix, each configured to interpolate features between the source and target domains. These methods generally involve linear combinations or spatial rearrangement of image contents from two separate classes, often leading to semantic inconsistencies or loss of salient visual features.

The lower row 104 includes the original target image and demonstrates augmentation results from label-preserving methods such as AugMix, PixMix, and IPMix, along with a sequence of results obtained using the present embodiment. The method, in accordance with the present embodiment, involves generating an image using a diffusion model conditioned on text prompts derived from the original image. The generated image is then partially concatenated with the original image to produce a hybrid image. Subsequently, this hybrid image is blended with a randomly selected self-similarity fractal image using a blending factor to introduce additional structural complexity and visual diversity. The resulting images shown in both source and target variants retain the semantic content of the original image while presenting augmented texture, lighting, and compositional elements, thereby facilitating enhanced generalization and adversarial robustness in model training. Each variant, corresponding to the present embodiment, shown in FIG. 1 visually demonstrates the transformation outcome corresponding to different configurations of prompt conditioning and fractal blending as applied to both domains.

Figure 2A:
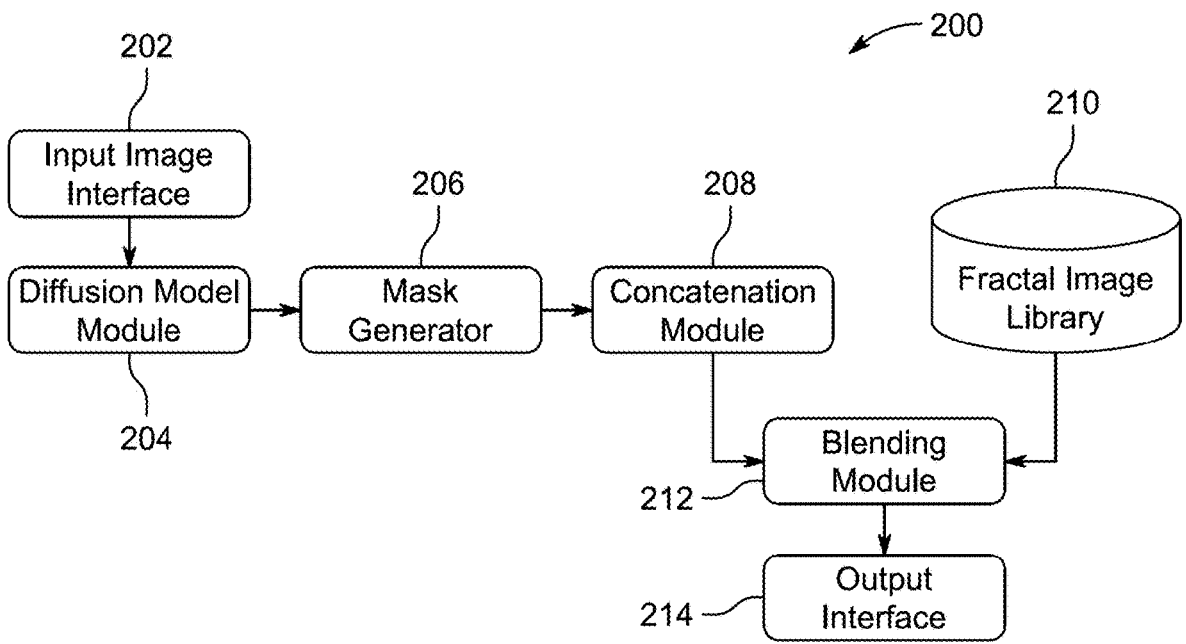
FIG. 2A is block diagram of a data augmentation system configured to generate augmented images, according to some embodiments of the present disclosure.

FIG. 2A illustrates a data augmentation system 200 configured to generate augmented images by combining diffusion-generated content with original image data and structural fractal patterns, according to certain embodiments. The system 200 includes an input image interface 202, a diffusion model module 204, a mask generator 206, a concatenation module 208, a fractal image library 210, a blending module 212, and an output interface 214.

The input image interface 202 is configured to receive an original image and at least one prompt. The prompt may include a descriptive keyword, phrase, or style specification designed to condition the generation of an image with intended visual characteristics. Examples of prompt content may specify visual effects such as watercolor art, rainbow, sunset, aurora, snowy, autumn, ukiyo-e, a sketch with crayon, or mosaic. The input image interface 202 may be implemented through a graphical interface, an application programming interface, or an automated image ingestion mechanism, depending on the computing environment.

The diffusion model module 204 is configured to generate a new image based on the original image and the provided prompt. The diffusion model applies a series of forward and reverse denoising operations on a noise distribution conditioned by the prompt. The generated image reflects both the semantic features derived from the prompt and latent structure inferred from the original image. The diffusion model module 204 may utilize pre-trained or fine-tuned generative diffusion architectures adapted for prompt-conditioned image synthesis.

The mask generator 206 is configured to produce a binary mask comprising a plurality of pixels corresponding to pixels of the original image and pixels of the generated image. Each pixel in the mask is assigned a value of either zero or one. The pixels having a value of one are designated to preserve the corresponding pixel from the original image, while the pixels having a value of zero are designated to retain the corresponding pixel from the generated image. The pixel-wise multiplication operation is applied by the concatenation module 208, which multiplies the pixels of the original image with respective pixels of the mask and multiplies the pixels of the generated image with the respective pixels of the complement of the mask. The complement is computed by inverting each binary value in the mask. The mask is configured such that at least one row or at least one column is entirely composed of zeros. In certain implementations, the mask is configured with one or more rows of zeros, including the upper half of the image height, or one or more columns of zeros, including the right half of the image width. These configurations enable structured and interpretable hybridization of image content across predefined spatial partitions.

The concatenation module 208 is configured to concatenate a portion of the original image with a portion of the generated image, as designated by the binary mask. The resulting hybrid image retains structural characteristics from both sources, preserving semantic coherence while introducing variability through spatial substitution. The concatenation operation may be implemented using tensor-level operations, direct pixel compositing, or masked image synthesis techniques.

The fractal image library 210 includes a collection of self-similar structural images exhibiting repeating patterns across scales. These images are derived from mathematical fractals or natural fractal-like formations and are selected randomly or contextually based on application criteria. The blending module 212 is configured to blend the hybrid image obtained from the concatenation module 208 with a selected fractal image from the fractal image library 210 using a blending factor. The blending factor controls the visual contribution of the fractal image to the final output. The blending operation may involve weighted pixel-wise summation, alpha compositing, or custom spatial blending kernels. The blended image captures the combined spatial regularity of the original and generated image portions along with structural complexity from the fractal pattern.

The output interface 214 is configured to output the resulting augmented image for further processing, model training, or visualization. The output interface may be implemented as a file storage interface, graphical rendering display, or interface to a machine learning data pipeline.

The data augmentation system 200 thus performs image-level augmentation using diffusion-based prompt-conditioned generation, binary mask-driven concatenation, and fractal-based structural enrichment. The system supports multiple mask configurations including full-zero rows, full-zero columns, half-image partitions, and complementary spatial compositions to enhance data diversity, model generalization, and resilience against adversarial perturbations.

Figure 2B:
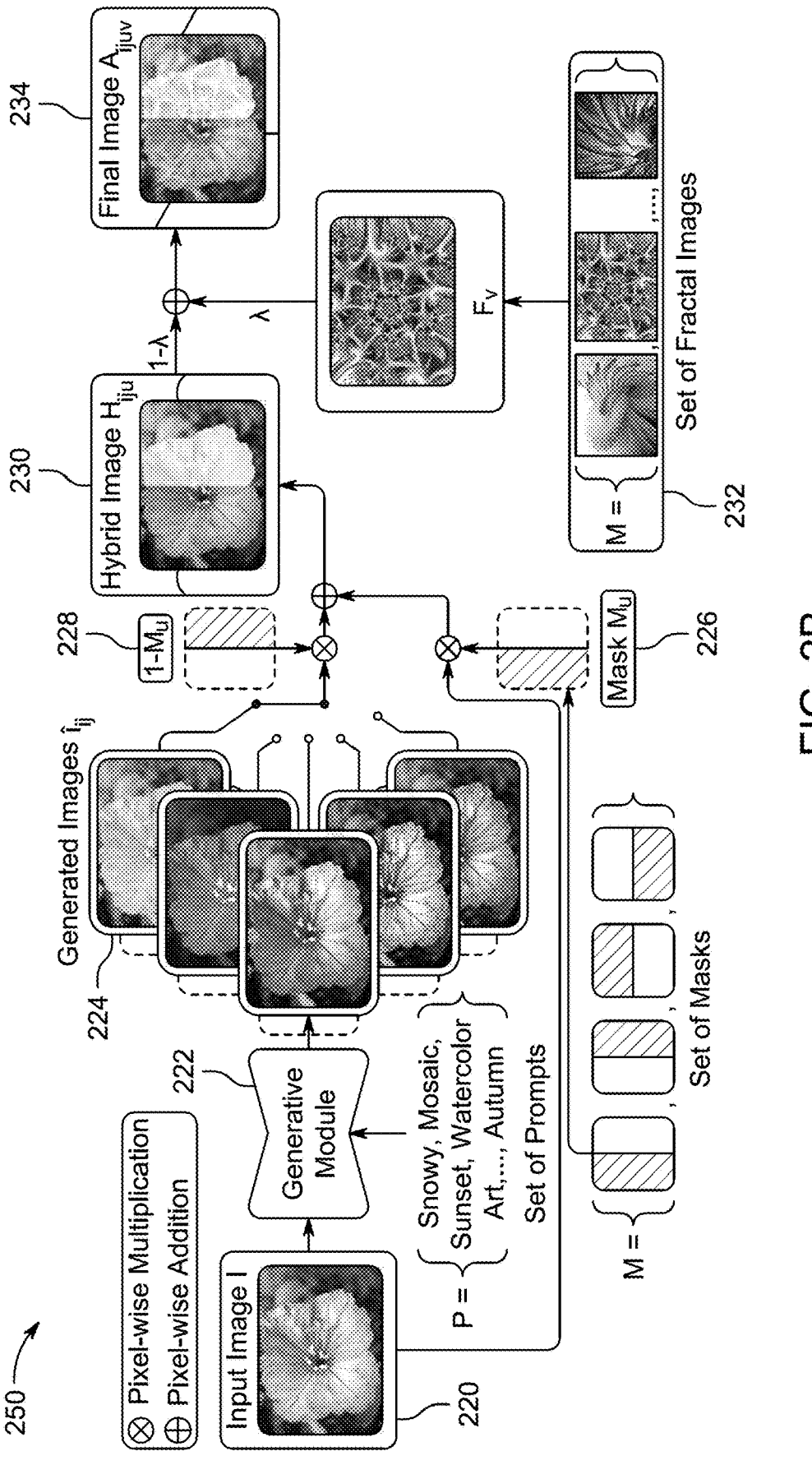
FIG. 2B illustrates a flow diagram of an image augmentation method configured to generate the augmented image, according to some embodiments of the present disclosure.

FIG. 2B illustrates an image augmentation system 250 configured to generate an augmented image by performing prompt-conditioned image generation, spatial blending using a binary mask, and texture fusion with fractal images. The system 250 initiates with an input image I, which is received via an input image interface, at step 220. The input image I is a real-world image selected from a training corpus and is intended to undergo structured augmentation to enhance visual diversity for downstream machine learning applications.

The input image I is provided to a generative module, at step 222. The generative module is implemented using a conditional diffusion model that accepts the input image I and a prompt P as inputs. The prompt P is selected from a predefined set of prompt expressions, which may include stylistic descriptors such as snowy, mosaic, sunset, watercolor art, and autumn. Based on the combination of the input image and the selected prompt, the generative module synthesizes one or more generated images $\hat{I}_j$ that reflect the visual semantics dictated by the prompt. The generated images $\hat{I}_j$ are produced, at step 224, and encapsulate stylistic or textural transformations that augment the base characteristics of the input image.

In parallel, a set of binary masks $\mathcal{M}$ is prepared, at step 226. Each binary mask $M_i$ in the set $\mathcal{M}$ defines a spatial region across the image dimensions, where a value of one indicates the region for retaining generated image content and a value of zero indicates retention of original image content. These masks act as spatial selectors in the compositing process and are used to control localized image mixing.

A hybrid image $H_{ij}$ is constructed using pixel-wise operations between the input image I, the generated image $\hat{I}_j$, and the selected binary mask $M_i$, at step 228. Specifically, the generated image $\hat{I}_j$ is multiplied pixel-wise with the binary mask $M_i$, retaining only those pixels corresponding to ones in the mask. In parallel, the input image I is multiplied pixel-wise with the complement of the binary mask, denoted as 1-$M_i$. The two resulting masked outputs are added together using pixel-wise summation, thereby producing a hybrid image $H_{ij}$ at step 230. The hybrid image $H_{ij}$ includes regions of the input image and stylistically transformed regions from the generated image, spatially arranged according to the structure defined by the binary mask $M_i$.

Following hybrid image construction, a texture blending operation is performed to further augment the visual characteristics. A fractal image $F_v$ is selected from a set of fractal images $\mathcal{F}$, represented at step 232. The set $\mathcal{F}$ includes a library of fractal textures that exhibit non-linear geometric patterns, self-similarity, and multiscale variance, which are suitable for enhancing robustness in data augmentation. The selected fractal image $F_v$ and the hybrid image $H_{ij}$ are combined using a weighted pixel-wise blending operation. A scalar blending factor λ is used to regulate the contribution of the fractal texture. The fractal image $F_v$ is multiplied with the scalar λ, while the hybrid image $H_{ij}$ is multiplied with the scalar $I_\lambda$. The resulting images are then added pixel-wise to produce the final augmented image $A_{ijv}$.

The final augmented image $A_{ijv}$, generated at step 234, encapsulates both the semantic transformation introduced by prompt-conditioned generative modelling and the structural complexity imparted by fractal-based blending. The image augmentation system 250 thereby enables a multi-stage process comprising prompt-guided generation, spatial masking, and fractal fusion to produce augmented images that improve generalization capabilities in machine learning models. The process is parameterized by the selection of the prompt P, the mask $M_i$, the fractal image Fv, and the blending coefficient λ, thereby allowing dynamic configuration and controlled diversity during training set construction.

Figure 3A:
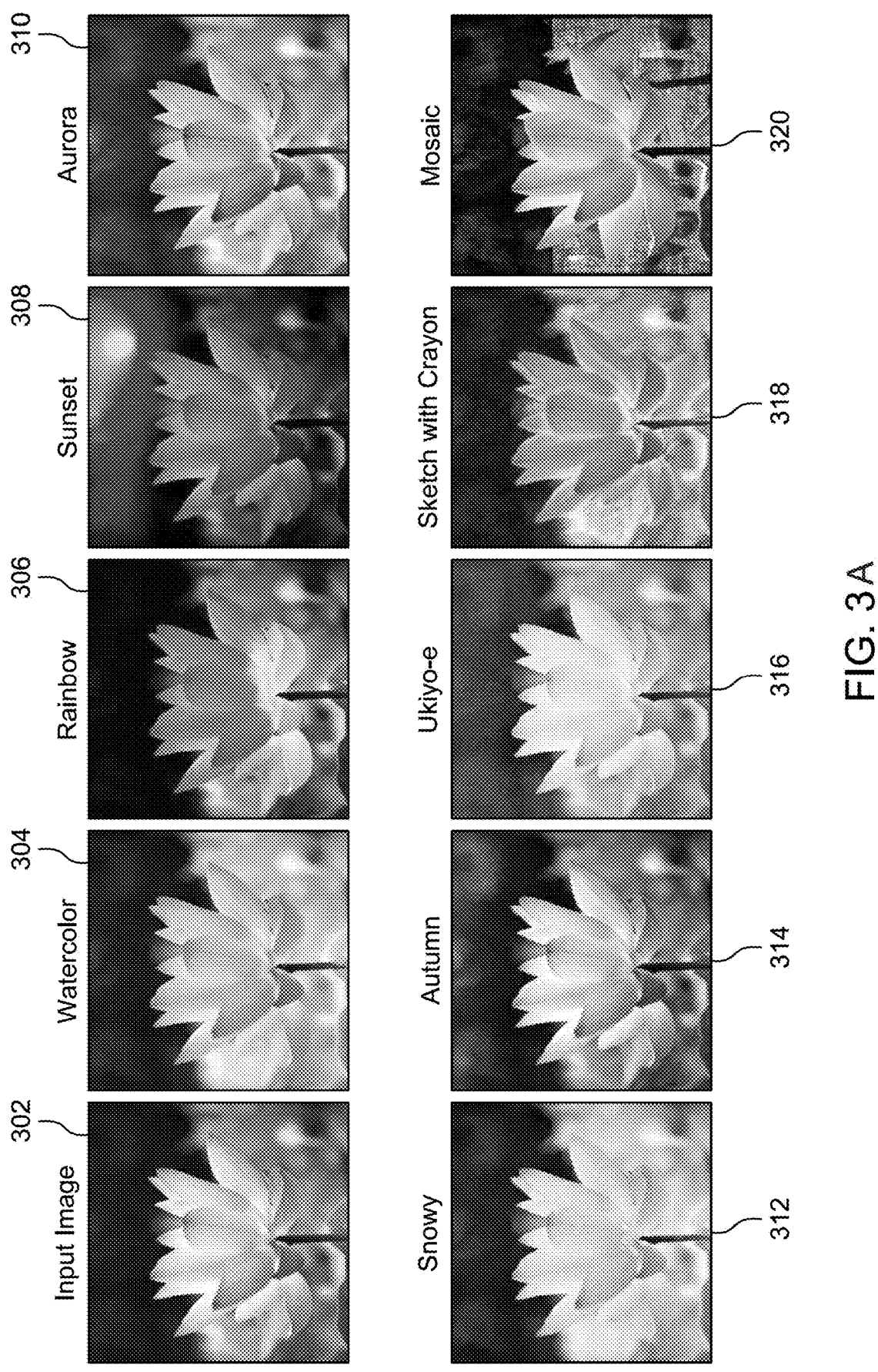
FIG. 3A illustrates a set of example output images generated using a collection of bespoke conditional prompts, according to some embodiments of the present disclosure.

FIG. 3A illustrates a set of examples output images generated using a collection of bespoke conditional prompts, demonstrating the visual diversity introduced to an input image using the system and method. An input image 302, comprising a photograph of a lotus flower, is shown to undergo generative transformation through a diffusion model conditioned on prompt-specific semantic attributes. The resultant generated images reflect both semantic consistency and visual richness while preserving the fundamental structural features of the original image.

A watercolor image 304 represents a generated output created using a prompt configured to simulate watercolor painting style, introducing softened edges and pigment-like textures that emulate traditional watercolor effects. A rainbow image 306 corresponds to a generative result using a prompt characterized by vibrant, multi-color illumination and saturation contrast, emphasizing aesthetic enhancement through color diversity. A sunset image 308 is generated using a prompt associated with a warm and intense lighting context, reproducing hues resembling those found during twilight, including deep reds and oranges, thereby enriching the object's visual context.

An aurora image 310 illustrates generation under a prompt embodying the atmospheric and spectral effects of an aurora, where gradient color shifts and luminescent overlays provide a stylized background while retaining object integrity. A snowy image 312 reflects output from a prompt inducing a winter-inspired ambient appearance, adding cool tones, increased exposure, and snowy textural elements across the petals and background. An autumn image 314 is derived using a prompt associated with seasonal transition, wherein warm tones, foliage-inspired patterns, and contextual shifts evoke an autumnal aesthetic.

An ukiyo-e image 316 is produced by applying a prompt trained on Japanese woodblock printing styles, exhibiting flat color areas, fine contours, and stylistic interpretations characteristic of traditional ukiyo-e artworks. A sketch with crayon image 318 displays a visual outcome using a prompt resembling children's hand-drawn illustrations, introducing irregular texturing, saturated outlines, and coarse fill effects that simulate wax-based crayon strokes. A mosaic image 320 is obtained using a prompt reflecting a tiled, abstract visual style wherein the flower image is rendered with apparent segmentation into geometric color patterns resembling mosaic artwork.

The data augmentation system may be used to enhance the robustness and generalization of the deep learning models. Formally, $I_i \in \mathbb{R}^{h \times w \times c}$ is an image from the training dataset, $D_{mix}(\bullet): \mathbb{R}^{h \times w \times c} \rightarrow \mathbb{R}^{h \times w \times c}$ denotes the data augmentation method. To obtain the final augmented image $A_{ijuv}$, the input image $I_i$ undergoes generation using prompt $p_j$, concatenation using mask $M_u$, and blending using fractal image $F_v$. The overall augmentation process, as also seen in Algorithm 1, can be represented as $A_{ijuv} = D_{mix}(I_i, p_j, M_u, F_v, \lambda)$.

The generation step $G(\bullet)$ consists of a pre-trained diffusion model that takes a prompt $p_j$ from a predefined set of k prompts, $P = \{p_1, p_2, \ldots, p_k\}$ where $j \in [1, k]$, along with the input image $I_i$, and produces an augmented counterpart image $\hat{I}_{ij}$. The image editing process in conventional diffusion models is often open-ended and guided by text prompts to obtain diverse image-to-image or text-to-image translations. In this context, the goal is to achieve a slightly modified but not too different version of $I_i$. Therefore, filter-like prompts are curated in P that do not alter the image drastically. Examples of the prompts used in the system are shown in FIG. 3A. The overall generation step is represented as: $\hat{I}_{ij} = G(I_i, p_j)$, where $p_j$ is a randomly selected prompt.

In concatenation phase, s portion of the original input image I is concatenated with its counterpart generated image $\hat{I}_{ij}$ using a randomly selected mask $M_u$ from the set of masks to create a hybrid image $H_{iju}$, $$H_{iju} = \left(\hat{I}_{ij} \odot M_u\right) + \left(I_i \odot (1 - M_u)\right) \tag{1}$$

Algorithm 1
Require: $I_i \in \mathcal{D}$, the training image dataset
   m: number of augmented images
   $p_j \in \mathcal{P}$,, the set of prompts $M_u \in \mathcal{M}$,, the set of masks
   $F_v \in \mathcal{F}$,, the library of fractal images
   $\lambda$: the blend ratio
   Ensure: $\mathcal{D}'$: m augmented images
   $\mathcal{D}' \leftarrow \emptyset$
   for each image $I_i$ in $\mathcal{D}$ do
      for a in {1: m} do
         Randomly select prompt $p_j$ from $\mathcal{P}$
         Generate image: $\hat{I}_{ij} \leftarrow G(I_i, p_j)$
         Randomly select mask $M_u$ from $\mathcal{M}$
         Hybrid image: $H_{iju} \leftarrow M_u \odot I_i + (1 - M_u) \odot \hat{I}_{ij}$
         Randomly select $F_v$ from $\mathcal{F}$
         Blended image: $A_{ijuv} \leftarrow (1 - \lambda)H_{iju} + \lambda F_v$
         Add $A_{ijuv}$ to $\mathcal{D}'$
      end for
   end for
   return $\mathcal{D}'$ The mask $M_u$ may consist of zeros and ones only, and $\odot$ is a pixel-wise multiplication operator. The set of masks contains four types of masks, including horizontal, vertical, and flipped versions. Such masking ensures that the semantics of the input image remain accessible to the learning network while also benefiting from the generated images.

A fractal image dataset $\mathcal{F}$ is collected and used to induce structural variations in the hybrid images while keeping the correct label for the training sample. In some embodiments, the fractal image dataset $\mathcal{F}$ includes a set of pre-collected fractal images that exhibit different fractal patterns including diverse global structures and local details. FIG. 3A shows several example fractal images 300a-300j taken from the fractal image dataset Each of these images represents a different type of fractal pattern, such as "autumnal fractal patterns," "winter wonderland," "sunset hues," "ukiyo-e inspired fractal," "autumn reimagined," "snowflake elegance," "dusk's fractal canvas," "east meets west," "seasonal shifts," and "frozen fractal patterns." These examples illustrate the wide range of shapes, colour transitions, and repeating structures that may be used during fractal blending. The examples in FIG. 3A show the type of visual content present in the fractal image dataset Each fractal image has its own overall appearance and fine-scale details, and the collection shows that the fractal image dataset $\mathcal{F}$ offers many different styles of structure. The visual differences may be useful because, when blended with a hybrid image $H_{iju}$, they introduce additional variation without changing the object or scene that is already present in the hybrid image. When a fractal image $F_v$ is combined with a hybrid image $H_{iju}$ using the blending factor $\lambda$, an augmented image is formed. The augmented image maintains the main content of the hybrid image but includes extra texture, structure, and colour patterns from the fractal image. This gives the training process more diverse images to learn from, while still keeping the correct label for the training sample.

Further, using the fractal images is helpful in creating controlled changes that do not confuse the meaning of the training data. The additional structures and patterns allow the present model to experience different backgrounds and appearances, which can reduce the tendency of the model to rely on specific backgrounds or textures that appear often in the original dataset. The model can learn features that are more stable across different visual conditions by seeing these varied blended images.

A randomly selected fractal image $F_v \in \mathcal{F}$ is blended with the hybrid image $H_{iju}$ using a blending factor $\lambda$ as follows:

$$A_{ijuv} = \lambda F_v + (1 - \lambda)H_{iju} \tag{2}$$

where $\lambda$ is the blending factor and a value of $\lambda$ is between 0 and 1. This operation produces a final augmented image $A_{ijuv}$ whose pixel values are a weighted combination of the hybrid image $H_{iju}$ and the fractal image $F_v$. This final augmented image $A_{ijuv}$ is used to train or fine-tune a deep learning model. The hybrid image $H_{iju}$ preserves the object and coarse structure of the original sample, while the fractal image $F_v$ contributes additional texture and background complexity. Combining Equations (1) and (2), the complete augmentation process is expressed as:

$$A_{ijuv} = (1 - \lambda)\left(I_i \odot M_u + \hat{I}_{ij} \odot (1 - M_u)\right) + \lambda F_v \tag{3}$$

In this way, each augmented image $A_{ijuv}$ contains: (i) a portion derived from the original input image $I_i$, (ii) a portion derived from the diffusion-generated image $\hat{I}_{ij}$, and (iii) a contribution from the fractal image $F_v$ controlled by $\lambda$. This three-way composition increases the diversity of textures and global appearance while maintaining the semantic structure of the object, thereby improving the robustness and generalisation of the learning model.

To compare with existing studies on image augmentation, the method is evaluated on several general image classification and fine-grained image classification datasets. For general image classification, three datasets are employed, ImageNet, CIFAR100, and Tiny-ImageNet-200. For fine-grained image classification, four datasets are used, Oxford102 Flower, Stanford Cars, Aircraft, and Caltech-UCSD Birds-200-2011 (CUB). These datasets offer a broad spectrum of image types involving a variety of objects such as plants, animals, transportation modes, human activities, satellite images, and other general categories.

The InstructPix2Pix diffusion model is utilized to generate images using the textual prompt library. For generating the mask M in Equation 1, a template image is divided into two equal parts either horizontally or vertically. One half is randomly activated and assigned a value of 1 (one), and the other is deactivated and assigned a value of 0 (zero). This generates two complementary regions that are later used to combine the diffusion-generated image with the original image to form the hybrid image $H_{iju}$.

In some embodiments, the influence of the fractal blending factor $\lambda$ on classification performance is quantitatively evaluated. The fractal blending factor $\lambda$ controls the relative contribution of the fractal image $F_v$ and the hybrid image $H_{iju}$ in the augmented image $A_{ijuv}$.

Across all experiments, $\lambda=0.20$ is used for blending the fractal image as per Equations 2 and 3. To study the effect of $\lambda$, the value is varied between 0.1 and 0.5, and the Top-1 accuracy is measured on the Flower102 dataset using a ResNet-50 model. The baseline model, which is a ResNet-50 trained without the proposed DiffuseMix augmentation, achieves a Top-1 accuracy of 78.73%. When the DiffuseMix augmentation method is applied, higher accuracy is obtained for all tested values of $\lambda$. The highest accuracy, 81.30%, is achieved when $\lambda=0.20$. A table of the measured values is provided below:

TABLE 1

| Impact of varying fractal blending ratio in DiffuseMix | |
| --- | --- |
| Method | Top-1 (%) |
| ResNet50 | 78.73 |
| +DiffuseMix ($\lambda = 0.1$) | 79.81 |
| +DiffuseMix ($\lambda = 0.2$) | 81.30 |
| +DiffuseMix ($\lambda = 0.3$) | 80.97 |
| +DiffuseMix ($\lambda = 0.4$) | 79.16 |
| +DiffuseMix ($\lambda = 0.5$) | 78.97 |
| DiffuseMix | 34.53 |

Table 1 summarises the impact of varying the fractal blending ratio in DIFFUSEMIX. For moderate $\lambda$ values (for example, between 0.10 and 0.30), the accuracy remains relatively stable and higher than the baseline, indicating that a moderate contribution from the fractal image $F_v$ is beneficial. As $\lambda$ approaches the upper end of the tested range (near 0.50), the performance begins to decline, which suggests that an overly strong fractal component may introduce too much background complexity or visual noise and partially obscure important semantic details of the object. Accordingly, in preferred embodiments, the factor $\lambda$ is selected from a moderate interval, such as 0.10-0.30, to balance the benefits of additional textural diversity against the need to preserve clear object structure. This $\lambda$-sensitivity analysis provides a practical guideline for tuning the fractal blending stage when applying DiffuseMix to new datasets or model architectures.

To ensure only suitable prompts are applied during diffusion-based generation, a predefined textual library of filter-like global visual effects is created. In an example embodiment, this prompt library includes terms such as "autumn," "snowy," "sunset," "watercolor art," "rainbow," "aurora," "mosaic," "ukiyo-e," and "sketch with crayon". These prompts are chosen for their broad applicability and minimal structural alteration of the images, producing a global visual transformation, i.e., change in the global appearance of an image, for example, colour tone, lighting or artistic style, while having minimal effect on the shape, position and outline of the object. Each prompt is appended to a template statement "A transformed version of image into prompt" to form a specific textual input to the diffusion model. Examples of images generated using these prompts are presented in FIG. 3A, which shows that the edited images retain clear object silhouettes and class-defining features while exhibiting varied colours, textures and backgrounds.

In some embodiments, the diffusion-based image generation step uses prompts that are selected to change the overall appearance of an image while keeping the main content visible. The prompts are chosen so that the edited image produced by the diffusion model maintains the shape and position of the original object, while applying changes such as colour shifts, lighting adjustments or stylistic effects.

Figure 3B:
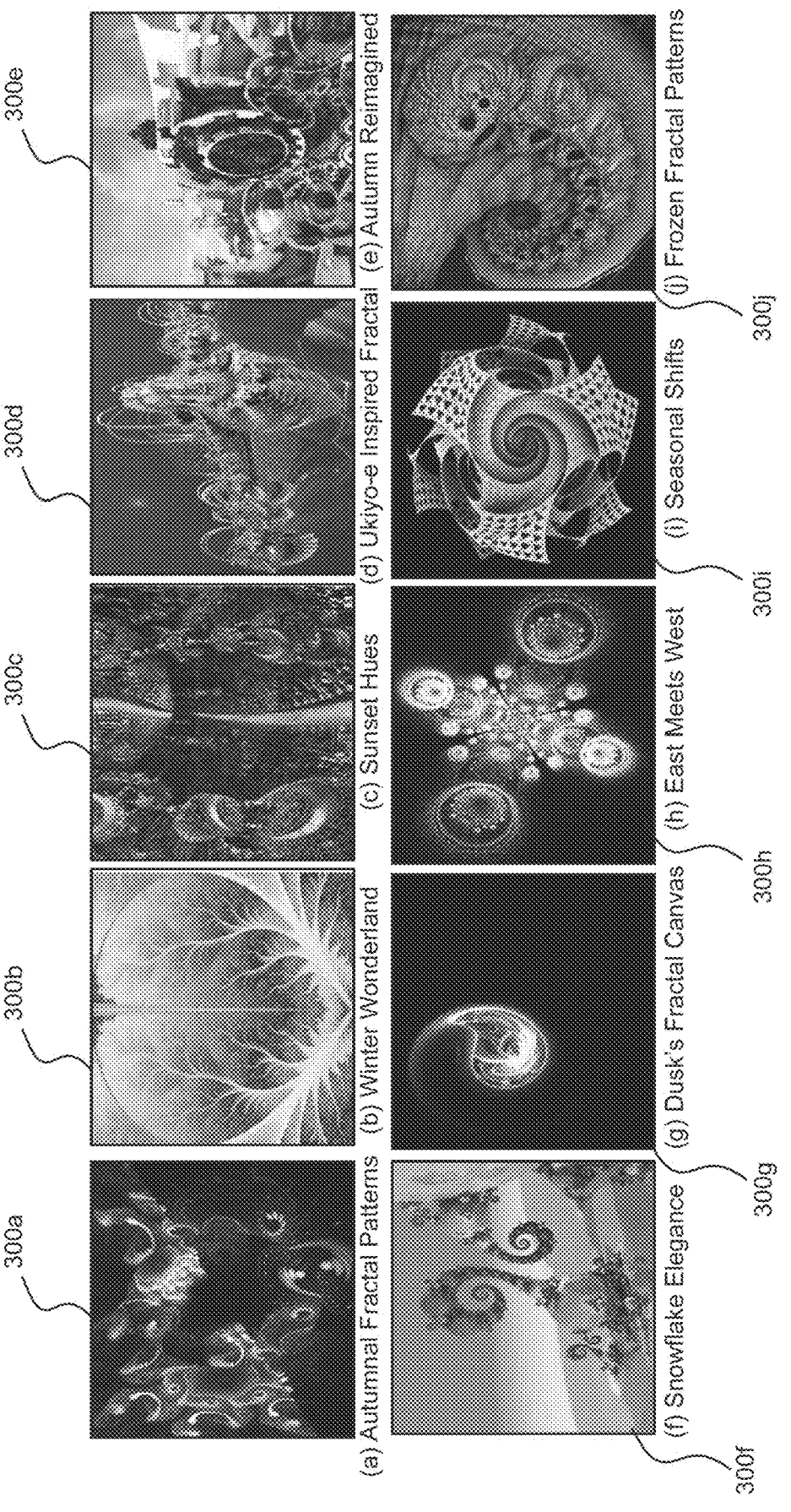
FIG. 3B illustrates several example fractal images taken from a fractal image dataset for use as training data of the data augmentation system, according to some embodiments of the present disclosure.
Figure 3C:
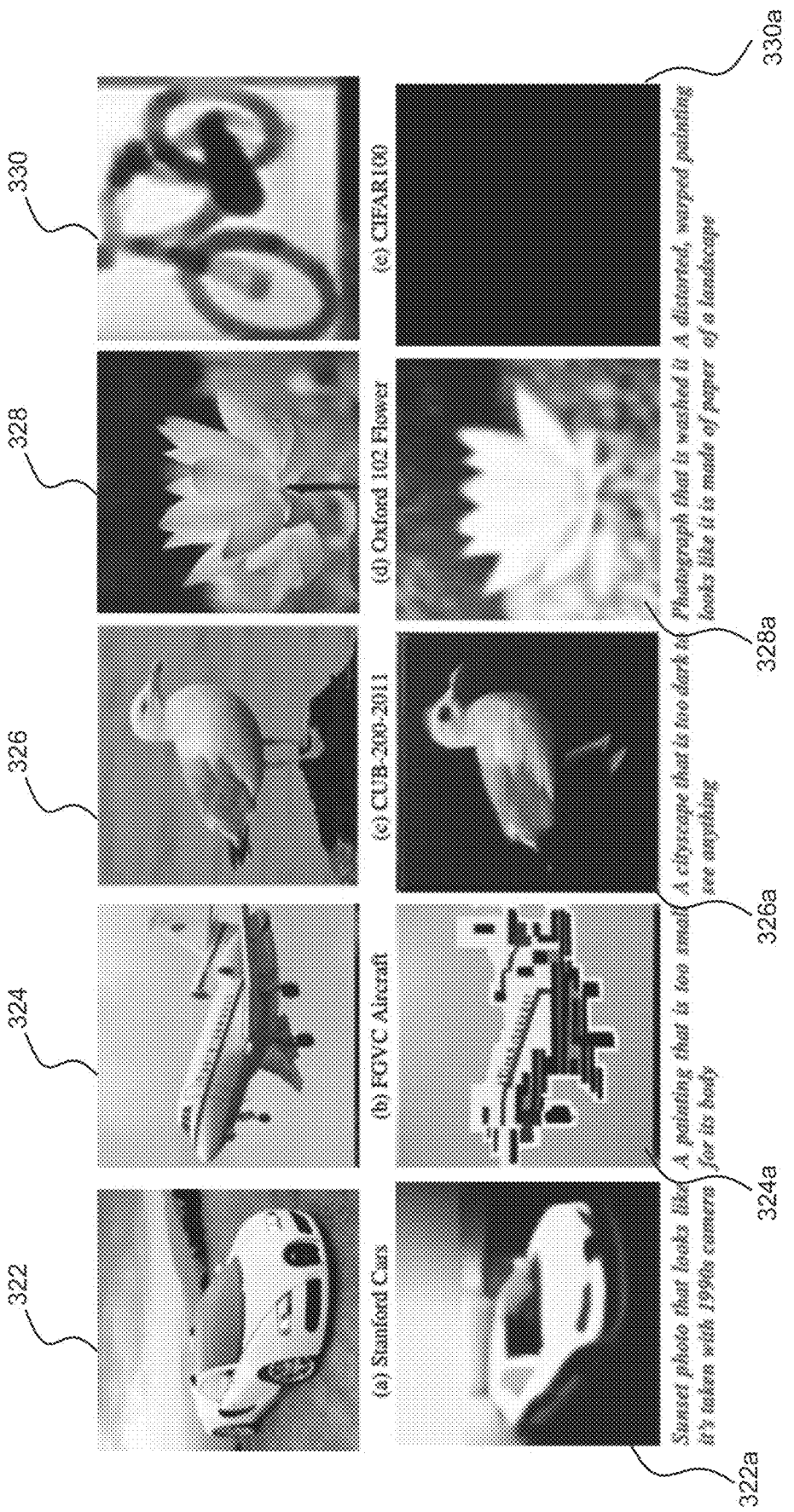
FIG. 3C illustrates a set of images in which the first row shows original images and the second row shows diffusion-generated images produced using descriptive prompts, according to some exemplary embodiments of the present disclosure.

In some embodiments, additional experiments are carried out to study the effect of poorly constructed prompts. FIG. 3B-3C shows examples in which the first row shows original images 322-330 taken from Stanford Cars, FGVC Aircraft, CUB-200-2011, Oxford-102 Flowers, and CIFAR-100. The second row shows diffusion-generated images 322a-330a that are produced using descriptive or narrative prompts such as "a sunset photo that looks like it's taken with a 1990s camera," "a painting that is too small for its body," "a cityscape that is too dark to see anything," "a photograph that is washed out and looks like it is made of paper," and "a distorted, warped painting of a landscape".

For example, the image 322a is created using a prompt referring to a "sunset photo that looks like it's taken with 1990s camera," resulting in a warmer colour tone and a different visual appearance, while still keeping the shape of the vehicle visible. The image 324a, generated using a prompt describing "a painting that is too small for its body," produces noticeable distortions and colour shifts. The image 326a, created from a prompt stating "a cityscape that is too dark to see anything," becomes very dark and lacks clear detail. The image 328a, produced using a prompt referring to a "photograph that is washed it looks like it is made of paper," appears washed out and lacks definition. The image 330a, produced from a CIFAR-100 sample using a prompt describing "a distorted, warped painting looks like it is made of paper of a landscape," becomes almost completely black.

These examples show that some prompts provide helpful variations in appearance, while some descriptive prompts may cause the generated images to become distorted, unclear or too dark, making them unsuitable for training. This effect affects the quality of small-resolution datasets such as CIFAR-100, where prompts that involve dark scenes or complex descriptions may result in images that contain little or no visible content.

Figure 4:
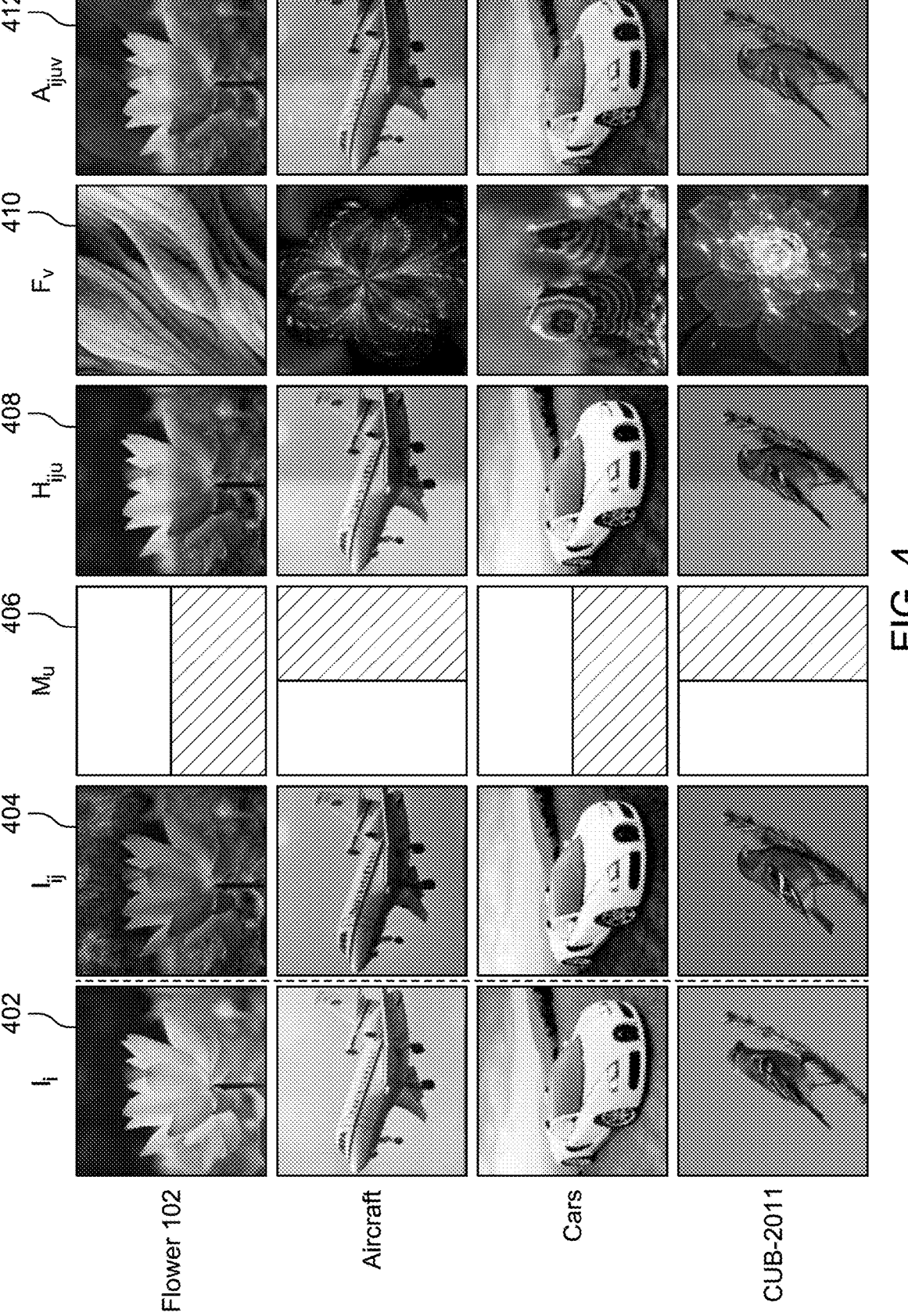
FIG. 4 illustrates a set of images derived at each stage of the data augmentation system, according to some embodiments of the present disclosure.

FIG. 4 presents images derived at each stage of the present data augmentation system. These images demonstrate that the data augmentation system yields a wider range of augmented outputs originating from the training data. The resulting images retain the full object structure without any omission and introduce appropriate variability for effective training.

FIG. 4 illustrates an exemplary visualization of the sequential transformation of input training images across various stages of the present data augmentation methodology, including the original input image, the generated image via a diffusion model, mask-based hybridization, fractal image selection, and final augmented image formation. Each column in FIG. 4 corresponds to a distinct stage in the transformation pipeline, and each row represents an instance of the process applied to an image selected from a different dataset, including Flower102, Aircraft, Cars, and CUB-2011.

Column 402 represents a set of original training images $I_i$ selected from the aforementioned benchmark datasets. These images include a lotus flower, an aircraft, a car, and a bird, each of which serves as the initial input to the data augmentation pipeline. The image $I_i$ belongs to the training dataset D and is defined over a space R^(h×w×c), where h denotes height, w denotes width, and c denotes the number of color channels.

Column 404 illustrates the diffusion-generated images $I_{ij}$, produced through a generation step that employs a pre-trained diffusion model configured to process the input image $I_i$ along with a randomly selected textual prompt $p_j$. The prompts $p_j$ are sourced from a predefined prompt set P comprising curated stylistic descriptors such as autumn, snowy, sunset, watercolor art, rainbow, aurora, mosaic, ukiyo-e, and sketch with crayon. These prompts are appended to a template structure in the form of "a transformed version of image into [prompt]" to produce suitable textual inputs for the diffusion model. The resulting generated image $I_{ij}$ is a slightly modified version of $I_i$ and is obtained by the expression $I_{ij}=G(I_i, p_j)$, where G(•) denotes the diffusion-based generation function.

Column 406 depicts the binary masks $M_u$, which are utilized to spatially combine the original and generated images in a hybrid image formation step. Each $M_u$ is selected randomly from a set of four predefined masks, including vertical and horizontal orientations and their flipped versions. The masks contain binary pixel values (0 or 1), ensuring pixel-level selection of visual content from $I_i$ and $I_{ij}$. The presence of these masks ensures that essential semantic components of the original image are preserved while simultaneously introducing transformed regions derived from the generated image.

Column 408 presents the hybrid images $H_{iju}$, obtained by applying the binary masks $M_u$ to perform element-wise combination of $I_i$ and $I_{ij}$. The hybridization process is represented by the operation $H_{iju}=I_{ij}\odot M_u+I_i\odot(1-M_u)$, where $\odot$ denotes pixel-wise multiplication. This operation results in an image that combines spatial segments from both the original and generated images, effectively retaining salient features while introducing visual diversity.

Column 410 exhibits the fractal images $F_v$, which are randomly selected from a library of fractal visual patterns. The fractal image $F_v$ introduces structured noise and abstract patterns into the hybrid image, enhancing the diversity of augmented data. These fractals are visually distinct and introduce additional variation to the training data without compromising object integrity.

Column 412 shows the final augmented images $A_{ijuv}$, which are produced by blending the hybrid image $H_{iju}$ with the fractal image $F_v$ using a predetermined blend ratio $\lambda$. The blending operation is defined by the expression $A_{ijuv}=(1-\lambda)H_{iju}+\lambda F_v$. The value of $\lambda$ is empirically set to 0.20 in all conducted experiments to ensure that the final augmented image maintains a recognizable visual structure while benefiting from fractal-induced variation. This augmented image $A_{ijuv}$ forms part of the augmented dataset D' and is used to train or fine-tune deep learning models.

The visual progression from column 402 to column 412 illustrates the implementation of each functional stage within the pipeline. These transformations demonstrate the method's ability to preserve semantic information, introduce controlled perturbations, and produce diverse yet meaningful augmented data samples. The method has been quantitatively evaluated using general image classification tasks, with results summarized in Table 2 and Table 3 below. The use of results in measurable improvements in Top-1 and Top-5 classification accuracy across multiple benchmark datasets including Tiny-ImageNet-200, CIFAR-100, and ImageNet, thereby validating the efficacy of the augmentation process in mitigating overfitting and enhancing generalization performance in deep learning models.

To compare DiffuseMix with existing image augmentation strategies, general classification experiments are conducted on the Tiny-ImageNet-200 and CIFAR-100 datasets using a PreActResNet-18 backbone trained from scratch for 300 epochs. Table 2 presents the Top-1 and Top-5 classification accuracy of models trained from scratch using PreactResNet-18 across 300 training epochs, replicating the standard evaluation protocol. In one or more exemplary embodiments, a range of augmentation methods, including mixup-based, corruption-based and saliency-guided approaches are compared with the DiffuseMix system. In these experiments, the Vanilla method [14] serves as the baseline, achieving Top-1 accuracies of 57.23% on Tiny-ImageNet-200 and 76.33% on CIFAR-100, with corresponding Top-5 accuracies of 73.65% and 91.02%. Traditional mixup-style methods and corruption-based methods provide some improvements in specific cases, while more recent saliency-guided and patch-based methods, such as PuzzleMix, Co-Mixup and Guided-AP, further raise performance. For example, Mixup [49] provides a small improvement on CIFAR-100 (76.84% Top-1) but a slight reduction in Top-1 accuracy on Tiny-ImageNet-200 (56.59%). Manifold Mixup [42] improves over Vanilla on both datasets, while CutMix [46] yields competitive but not leading performance. Corruption-based methods such as AugMix [15] and PixMix [17] offer further gains, particularly on CIFAR-100 for PixMix. Saliency-guided and patch-based approaches, including SaliencyMix [40], Guided-SR [21], PuzzleMix [23], Co-Mixup [22] and Guided-AP [21], show additional improvements over the earlier mixup and corruption-based methods. The DiffuseMix method achieves the highest accuracies across all reported metrics. The present system outperforms all referenced methods across both Tiny-ImageNet-200 and CIFAR-100 datasets, achieving Top-1/Top-5 accuracy of 65.77% o/83.66% on Tiny-ImageNet-200 and 82.500%/95.41% on CIFAR-100, respectively.

TABLE 2

Top-1 and Top-5 accuracy on general classification task of PreactResNet-18 trained from scratch for 300 epochs

| Method | Tiny-ImageNet-200 | | CIFAR-100 | |
| --- | --- | --- | --- | --- |
| | Top-1 (%) | Top-5 (%) | Top-1 (%) | Top-5 (%) |
| Vanilla [14] | 57.23 | 73.65 | 76.33 | 91.02 |
| Mixup [49] | 56.59 | 73.02 | 76.84 | 92.42 |
| Manifold [42] | 58.01 | 74.12 | 79.02 | 93.37 |
| CutMix [46] | 56.67 | 75.52 | 76.80 | 91.91 |
| AugMix [15] | 55.97 | 74.68 | 75.31 | 91.62 |
| PixMix [17] | — | — | 79.70 | — |
| SaliencyMix [40] | 56.54 | 76.14 | 79.75 | 94.71 |
| Guided-SR [21] | 55.97 | 74.68 | 80.60 | 94.00 |
| PuzzleMix [23] | 63.48 | 75.52 | 80.38 | 94.15 |
| Co-Mixup [22] | 64.15 | — | 80.15 | — |
| Guided-AP [21] | 64.63 | 82.49 | 81.20 | 94.88 |
| DiffuseMix (proposed) | 65.77 | 83.66 | 82.50 | 95.41 |

15

[14] K. He, Xiangyu Zhang, Shaoqing Ren, and Jian Sun. Deep residual learning for image recognition. In CVPR, 2016, incorporated by reference in its entirety.

[15] Dan Hendrycks, Norman Mu, Ekin Dogus Cubuk, Barret Zoph, Justin Gilmer, and Balaji Lakshminaray-anan. Aug-mix: A simple data processing method to improve robustness and uncertainty. In International Conference on Learning Representations, incorporated by reference in its entirety.

[17] Dan Hendrycks, Andy Zou, Mantas Mazeika, Leonard Tang, Bo Li, Dawn Song, and Jacob Steinhardt. Pixmix: Dream-like pictures comprehensively improve safety measures. In Proceedings of the IEEE/CVF Conference on Computer Vision and Pattern Recognition, pages 16783-16792, 2022, incorporated by reference in its entirety.

[21] Minsoo Kang and Suhyun Kim. Guidedmixup: an efficient mixup strategy guided by saliency maps. In AAAI, pages 1096-1104, 2023, incorporated by reference in its entirety.

[22] JangHyun Kim, Wonho Choo, Hosan Jeong, and Hyun Oh Song. Co-mixup: Saliency guided joint mixup with supermodular diversity. In International Conference on Learning Representations, 2020, incorporated by reference in its entirety.

[23] Jang-Hyun Kim, Wonho Choo, and Hyun Oh Song. Puzzle mix: Exploiting saliency and local statistics for optimal mixup. In International Conference on Machine Learning, pages 5275-5285. PMLR, 2020, incorporated by reference in its entirety.

[40] AFM Uddin, Mst Monira, Wheemyung Shin, TaeChoong Chung, Sung-Ho Bae, et al. Saliencymix: A saliency guided data augmentation strategy for better regularization. arXiv preprint arXiv:2006.01791, 2020, incorporated by reference in its entirety.

[41] Vikas Verma, Alex Lamb, Christopher Beckham, Amir Na-jafi, Ioannis Mitliagkas, David Lopez-Paz, and Yoshua Bengio. Manifold mixup: Better representations by interpolating hidden states. In International conference on machine learning, pages 6438-6447. PMLR, 2019, incorporated by reference in its entirety.

[42] Catherine Wah, Steve Branson, Peter Welinder, Pietro Per-ona, and Serge Belongie. The caltechucsd birds-200-2011 dataset. 2011, incorporated by reference in its entirety.

[46] Sangdoo Yun, Dongyoon Han, Seong Joon Oh, San-ghyuk Chun, Junsuk Choe, and Youngjoon Yoo. Cutmix: Regularization strategy to train strong classifiers with localizable features. In Proceedings of the IEEE/CVF international conference on computer vision, pages 6023-6032, 2019, incorporated by reference in its entirety.

[49] Lvmin Zhang, Anyi Rao, and Maneesh Agrawala. Adding conditional control to text-to-image diffusion models. In Proceedings of the IEEE/CVF International Conference on Computer Vision, pages 3836-3847, 2023, incorporated by reference in its entirety.

Table 3 provides a performance comparison on the ImageNet-1K dataset, where models are trained using ResNet-50 over 100 epochs. The system demonstrates superior classification accuracy, achieving Top-1 accuracy of 78.64% and Top-5 accuracy of 95.32%, surpassing all other techniques.

16

TABLE 3

Top-1/Top-5 performance on ImageNet-1K dataset benchmark when trained on ResNet-50 for 100 epochs for general classification task

| Method | Top-1 (%) | Top-5 (%) |
| --- | --- | --- |
| Vanilla [14] | 75.97 | 92.66 |
| AugMix [15] | 76.75 | 93.30 |
| Manifold Mixup [42] | 76.85 | 93.50 |
| Mixup [49] | 77.03 | 93.52 |
| CutMix [46] | 77.08 | 93.45 |
| Guided-SR [23] | 77.20 | 93.66 |
| PixMix [17] | 77.40 | — |
| PuzzleMix [23] | 77.51 | 93.76 |
| GuidedMixup [21] ] | 77.53 | 93.86 |
| Co-Mixup [22] | 77.63 | 93.84 |
| YOCO [13] | 77.88 | — |
| DiffuseMix | 78.64 | 95.32 |

[13] Junlin Han, Pengfei Fang, Weihao Li, Jie Hong, Mohammad Ali Armin, Ian Reid, Lars Petersson, and Hongdong Li. You only cut once: Boosting data augmentation with a single cut. In International Conference on Machine Learning (ICML), 2022, incorporated by reference in its entirety.

[14] K. He, Xiangyu Zhang, Shaoqing Ren, and Jian Sun. Deep residual learning for image recognition. In CVPR, 2016, incorporated by reference in its entirety.

[15] Dan Hendrycks, Norman Mu, Ekin Dogus Cubuk, Barret Zoph, Justin Gilmer, and Balaji Lakshminaray-anan. Aug-mix: A simple data processing method to improve robustness and uncertainty. In International Conference on Learning Representations, incorporated by reference in its entirety.

[17] Dan Hendrycks, Andy Zou, Mantas Mazeika, Leonard Tang, Bo Li, Dawn Song, and Jacob Steinhardt. Pixmix: Dream-like pictures comprehensively improve safety measures. In Proceedings of the IEEE/CVF Conference on Computer Vision and Pattern Recognition, pages 16783-16792, 2022, incorporated by reference in its entirety.

[21] Minsoo Kang and Suhyun Kim. Guidedmixup: an efficient mixup strategy guided by saliency maps. In AAAI, pages 1096-1104, 2023, incorporated by reference in its entirety. JangHyun Kim, Wonho Choo, Hosan Jeong, and Hyun Oh Song. Co-mixup: Saliency guided joint mixup with supermodular diversity. In International Conference on Learning Representations, 2020, incorporated by reference in its entirety.

[23] Jang-Hyun Kim, Wonho Choo, and Hyun Oh Song. Puzzle mix: Exploiting saliency and local statistics for optimal mixup. In International Conference on Machine Learning, pages 5275-5285. PMLR, 2020, incorporated by reference in its entirety.

[42] Catherine Wah, Steve Branson, Peter Welinder, Pietro Per-ona, and Serge Belongie. The caltechucsd birds-200-2011 dataset. 2011, incorporated by reference in its entirety.

[46] Sangdoo Yun, Dongyoon Han, Seong Joon Oh, San-ghyuk Chun, Junsuk Choe, and Youngjoon Yoo. Cutmix: Regularization strategy to train strong classifiers with localizable features. In Proceedings of the IEEE/CVF international conference on computer vision, pages 6023-6032, 2019, incorporated by reference in its entirety.

[49] Lvmin Zhang, Anyi Rao, and Maneesh Agrawala. Adding conditional control to text-to-image diffusion models. In Proceedings of the IEEE/CVF International Conference on Computer Vision, pages 3836-3847, 2023, incorporated by reference in its entirety.

Figure 5A:
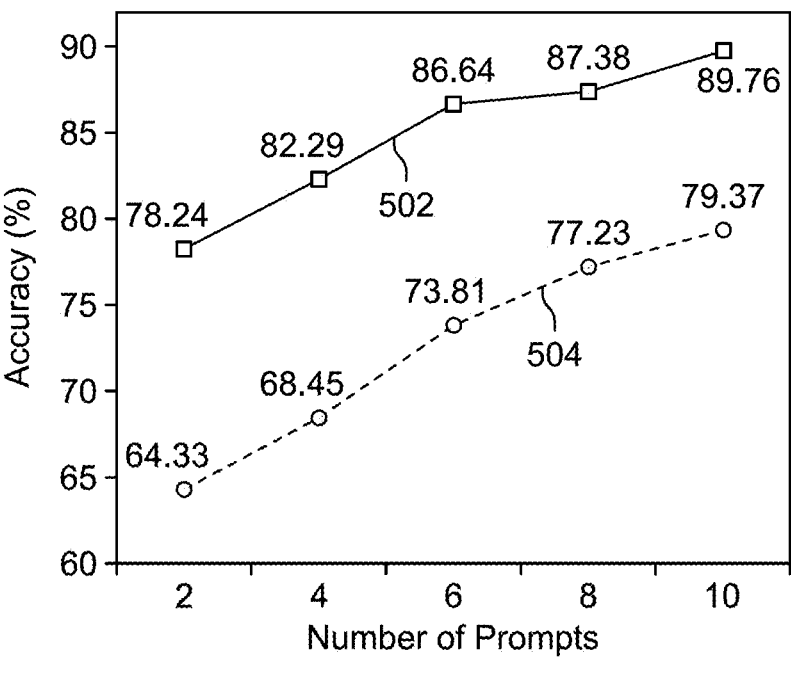
FIG. 5A is a graphical presentation of experimental results on the CUB-200-2011 dataset, according to some embodiments of the present disclosure.

These results indicate that the combination of diffusion-generated images, binary-mask hybrid images and fractal-based blending provides stronger generalisation than existing augmentation strategies, including the saliency-guided and patch-optimised techniques. FIG. 5A presents experimental results on the CUB-200-2011 dataset. The first curve 504, marked by circular blue data points, represents the Top-1 accuracy, whereas the second curve 502, marked by red square data points, represents the Top-5 accuracy. As the number of prompts increases from 2 to 10, the Top-1 accuracy improves from 64.33% to 79.37%, and the Top-5 accuracy increases from 78.24% to 89.76%, indicating a steady and consistent improvement in classification performance with greater prompt diversity.

Figure 5B:
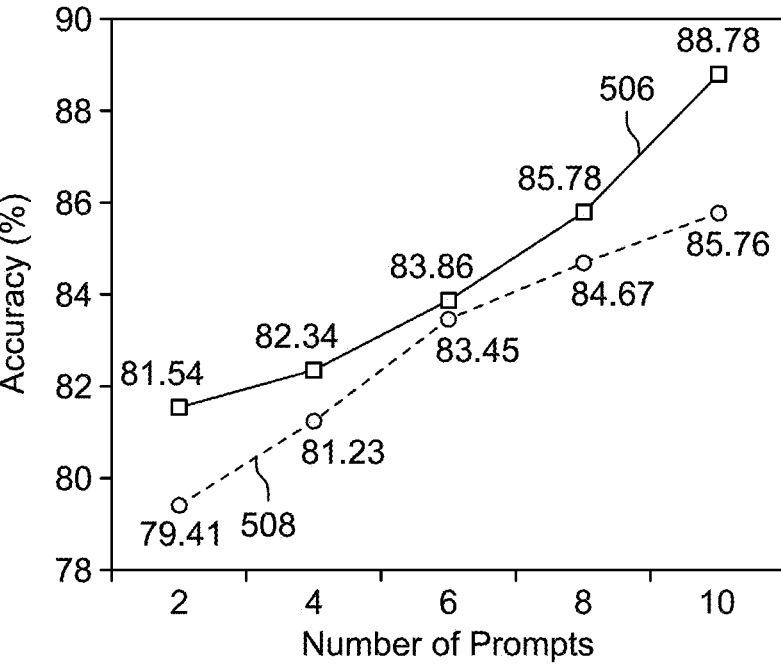
FIG. 5B is a graphical presentation of the effect of prompt variation on the FGVC Aircraft dataset, according to some embodiments of the present disclosure.

FIG. 5B illustrates the effect of prompt variation on the FGVC Aircraft dataset. The first curve 508, depicted by blue circles, represents the Top-1 accuracy, and the second curve 506, depicted by red squares, denotes the Top-5 accuracy. The Top-1 accuracy increases from 79.41% to 85.76% as the number of prompts increases from 2 to 10, while the Top-5 accuracy improves from 81.54% to 88.78%, demonstrating that prompt diversity contributes positively to both classification precision and robustness in this dataset.

Figure 5C:
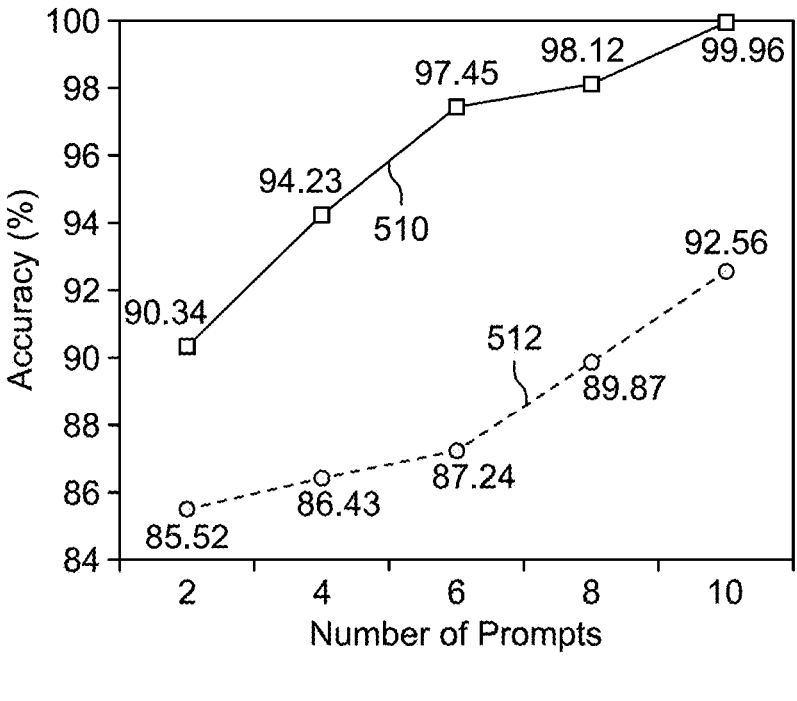
FIG. 5C is a graphical presentation of the performance of the augmentation technique on the Stanford Cars dataset, according to some embodiments of the present disclosure.

FIG. 5C demonstrates the performance of the augmentation technique on the Stanford Cars dataset. The first curve 512, represented by blue circular markers, corresponds to the Top-1 accuracy, and the second curve 510, shown using red square markers, corresponds to the Top-5 accuracy. The Top-1 accuracy increases from 85.52% to 92.56%, and the Top-5 accuracy improves significantly from 90.34% to 99.96% as the number of prompts is incremented from 2 to 10. These results confirm the strong correlation between prompt multiplicity and improved model generalization.

In accordance with standard evaluation practices adopted in contemporary state-of-the-art methodologies, the robustness of the disclosed augmentation technique is evaluated under adversarial perturbation scenarios. The Fast Gradient Sign Method (FGSM) is employed for crafting adversarially perturbed input instances. The purpose of this evaluation is to assess the resilience of the system to adversarial attacks and to determine whether its augmentation framework yields enhanced robustness under such threat models. FGSM-based error rates are computed as the primary metric of adversarial robustness.

Robustness to adversarial perturbation is further evaluated in, which reports FGSM error rates for PreactResNet-18 on CIFAR-100 and Tiny-ImageNet-200 datasets. The system exhibits the lowest error rates of 17.38% on CIFAR-100 and 34.53% on Tiny-ImageNet-200. These results underscore the resilience of the system under adversarial conditions, affirming its superiority over existing augmentation strategies, as shown in Table 4.

TABLE 4

FGSM error rates on CIFAR-100 and
Tiny-ImageNet-200 datasets for PreactResNet-18

| Method | FGSM Error Rates (%) | |
| --- | --- | --- |
| | CIFAR-100 | Tiny-ImageNet-200 |
| Vanilla [14] | 23.67 | 42.77 |
| Mixup [48] | 23.16 | 43.41 |
| Manifold [41] | 20.98 | 41.99 |
| CutMix [45] | 23.20 | 43.33 |
| AugMix [15] | 43.33 | — |
| PuzzleMix [23] | 19.62 | 36.52 |
| DiffuseMix | 17.38 | 34.53 |

[14] K. He, Xiangyu Zhang, Shaoqing Ren, and Jian Sun. Deep residual learning for image recognition. In CVPR 2016, incorporated by reference in its entirety.

[48] Hongyi Zhang, Moustapha Cisse, Yann N. Dauphin, and David Lopez-Paz. mixup: Beyond empirical risk minimization. In ICLR, 2018, incorporated by reference in its entirety.

[41] Vikas Verma, Alex Lamb, Christopher Beckham, Amir Najafi, Ioannis Mitliagkas, David Lopez-Paz, and Yoshua Bengio. Manifold mixup: Better representations by interpolating hidden states. In International conference on machine learning, pages 6438-6447. PMLR, 2019, incorporated by reference in its entirety.

[45] Sangdoo Yun, Dongyoon Han, Seong Joon Oh, Sanghyuk Chun, Junsuk Choe, and Youngjoon Yoo. Cutmix: Regularization strategy to train strong classifiers with localizable features. CoRR, abs/1905.04899, 2019, incorporated by reference in its entirety.

[15] Dan Hendrycks, Norman Mu, Ekin Dogus Cubuk, Barret Zoph, Justin Gilmer, and Balaji Lakshminarayanan. Augmix: A simple data processing method to improve robustness and uncertainty. In International Conference on Learning Representations, incorporated by reference in its entirety.

[23] Jang-Hyun Kim, Wonho Choo, and Hyun Oh Song. Puzzle mix: Exploiting saliency and local statistics for optimal mixup. In International Conference on Machine Learning, pages 5275-5285. PMLR, 2020, incorporated by reference in its entirety.

The performance of the system or the DiffuseMix method/model is further assessed in the context of fine-grained visual classification, a domain where inter-class differences are subtle and require augmentation techniques capable of preserving class-specific nuances. Experiments are conducted on the Caltech-UCSD Birds-200-2011 (CUB-200-2011) dataset, Stanford Cars dataset, and Fine-Grained Visual Classification (FGVC) Aircraft dataset using a ResNet-50 architecture. Table 5 compares DiffuseMix with automated policy-based augmentation methods such as AdaAug) and mixup-family methods (including Mixup, CutMix, SnapMix, PuzzleMix, Co-Mixup and Guided-AP) and presents the Top-1 accuracy comparison across methods. The system achieves the highest accuracy across all datasets: 79.37% on Birds, 85.76% on Aircraft, and 91.26% on Cars.

Figure 6A:
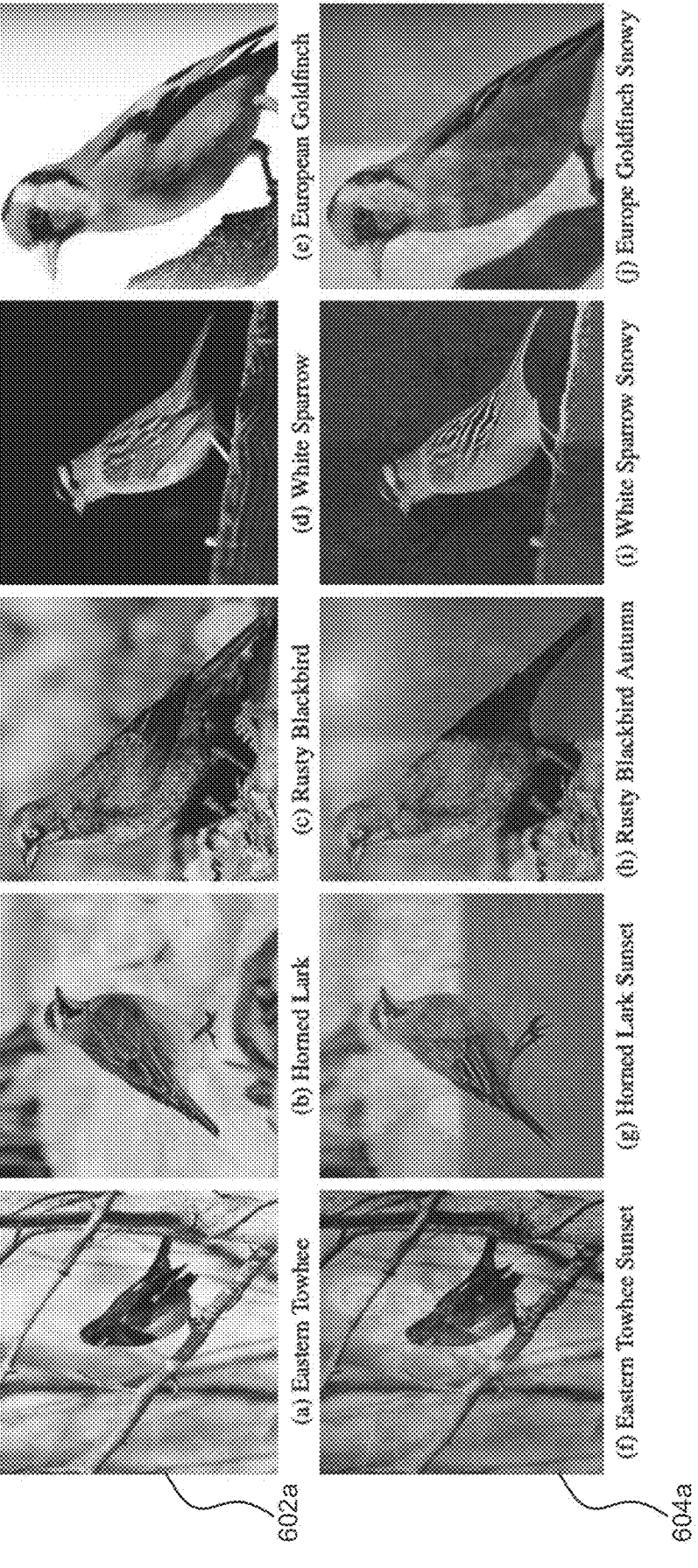
FIG. 6A illustrates original and DiffuseMix augmented bird images from the CUB-200-2011 dataset, according to some embodiments of the present disclosure.
Figure 6B:
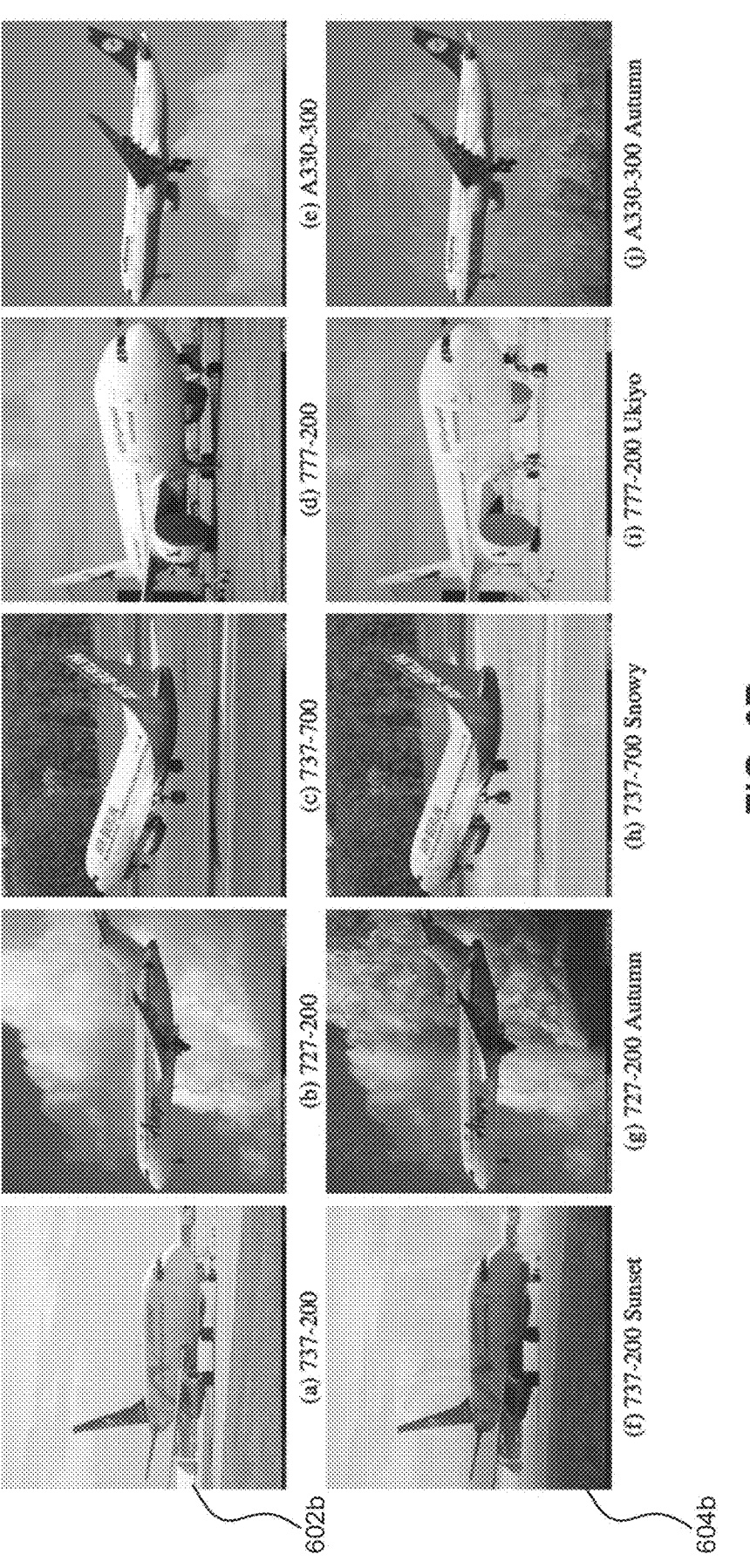
FIG. 6B illustrates original and DiffuseMix augmented aircraft images from the FGVC-Aircraft benchmark dataset, according to some embodiments of the present disclosure.
Figure 6C:
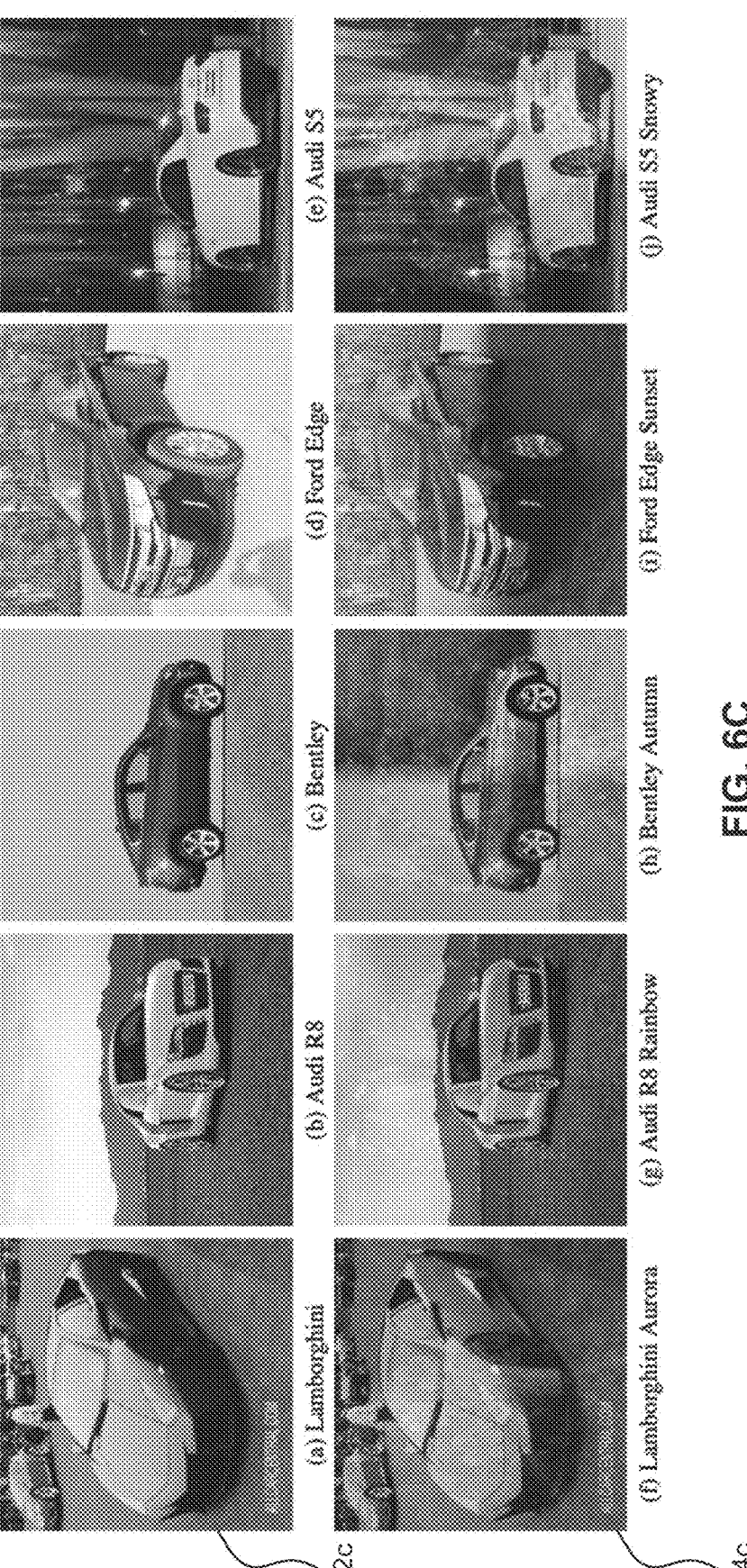
FIG. 6C illustrates original images from the Stanford Cars benchmark dataset and the images transformed using the DiffuseMix method, according to some embodiments of the present disclosure.

To evaluate performance on fine-grained visual classification tasks, the system is tested on CUB-200-2011 as depicted in FIG. 6A, FGVC Aircraft as depicted in FIG. 6B, and Stanford Cars as depicted in FIG. 6C, using a ResNet-50 model trained from scratch. The methods are grouped into automated policy-based augmentation methods and mixup-family methods.

FIG. 6A illustrates original and DiffuseMix augmented bird images from the CUB-200-2011 dataset. Top row 602a displays a selection of original, high-resolution bird images, capturing the natural beauty and diversity of species such as the eastern towhee, horned lark, rusty blackbird, white sparrow, and European goldfinch. Bottom row 604a demonstrates the augmented images obtained using DiffuseMix. The augmented images are visually striking and contextually varied representations of the original subjects. On the CUB-200-2011 dataset, which requires distinguishing subtle variations in bird species such as wing-pattern differences, colour gradients, and fine feather textures, DiffuseMix achieves 79.37% accuracy, outperforming both automated-search policies and mixup-style approaches. Methods such as CutMix (72.58%), SnapMix (75.53%) and GuidedMixup (77.08%) improve over the baseline, but none match the accuracy provided by DiffuseMix. This indicates that the combination of diffusion-generated images and structured hybrid image formation enables the DiffuseMix model to learn discriminative cues without distorting object structure.

FIG. 6B illustrates original and DiffuseMix augmented aircraft images from the FGVC-Aircraft benchmark dataset, which presents original aircraft images in a top row 602b each portraying a distinct airplane including the Boeing 737-200, 727-200, 737-700, 777-200, and Airbus A330-300. These images highlight the design resemblance of various aircraft models, serving as a challenging resource for aircraft fined-grained image classification studies. Bottom row 604b showcases the augmented images obtained using the DiffuseMix method for each corresponding input image. As seen in the bottom row 604b, the DiffuseMix method reimagined each aircraft with unique prompts such as sunset, autumn, snowy and ukiyo resulting in a rich visual appearance with diverse contexts. This also illustrates how image augmentation can be used to simulate different environmental and stylistic scenarios, enhancing the robustness and versatility of the dataset for training robust neural networks.

On FGVC Aircraft, which contains classes differentiated by small structural and stylistic differences between similar aircraft models, DiffuseMix achieves 85.76% Top-1 accuracy. This exceeds the performance of GuidedMixup (84.32%), Co-Mixup (83.57%), SaliencyMix (83.14%) and all automated augmentation-policy approaches (82.20-82.50%). The hybrid images and fractal-blending steps create variations in the background and global appearance without altering the core structure of the aircraft, allowing the DiffuseMix model to capture fine, class-dependent visual details.

FIG. 6C illustrates original images from the Stanford Cars benchmark dataset and the images transformed using the present DiffuseMix method. First row 602c showcases original images from the Stanford Cars benchmark dataset, featuring unaltered depictions of various car models including a lamborghini, audi R8, bentley, ford edge and audi S5. Second row 604c presents the images transformed using the present DiffuseMix method. The effects of prompts are visible in the generated portions of the images. For example, lamborghini is changed to green when aurora prompt is applied, creating a vibrant image. The front side of audi R8 becomes more color-rich when it is generated with rainbow prompt. The ambiance (background context) of bentley transforms significantly when autumn prompt is used. Similar diverse transformations are observed in other examples. These augmented images demonstrate the capability of present DiffuseMix method in generating visually enriched augmented images for better generalization. On Stanford Cars, DiffuseMix also achieves the highest accuracy (91.26%), surpassing SnapMix (90.10%), GuidedMixup (90.27%), and AdaAug (88.49%). The Cars dataset is highly sensitive to minor changes in viewpoint, reflections and shape outlines. DiffuseMix preserves object geometry in the augmented images, enabling the model to learn class boundaries more effectively while still experiencing good variations in environment or appearance. Across all datasets, DiffuseMix achieves the highest Top-1 accuracy among all compared methods, obtaining 79.37% on CUB-200-2011 (Birds), 85.76% on FGVC Aircraft, and 91.26% on Stanford Cars. These values exceed the performance of both automated-policy-based methods and mixup-family methods, demonstrating the effectiveness of combining diffusion-generated visual variations, hybrid image formation and fractal-based texture blending when learning fine-grained distinctions.

TABLE 5

Top-1 (%) performance comparison on fine-grained task of ResNet-50

| | Method | Birds | Aircraft | Cars |
|---|---|---|---|---|
| Automated | Vanilla [14] | 65.50 | 80.29 | 85.52 |
| | Auto Aug [8] | | 82.28 | 88.04 |
| | Fast AA [31] | — | 82.20 | 87.19 |
| | DADA [28] | — | 81.16 | 87.14 |
| | RA [9] | — | 82.30 | 87.79 |
| | AdaAug [5] | — | 82.50 | 88.49 |
| Mixup family | Mixup [48] | 71.33 | 82.38 | 88.14 |
| | CutMix [45] | 72.58 | 82.45 | 89.22 |
| | SaliencyMix [41] | 66.66 | 83.14 | 89.04 |
| | Guided-SR [21] | 74.08 | 83.51 | 89.23 |
| | SnapMix [19] | 75.53 | 82.96 | 90.10 |
| | PuzzleMix [23] | 74.85 | 82.66 | 89.68 |
| | Co-Mixup [22] | 72.83 | 83.57 | 89.53 |
| | Guided-AP [21] | 77.08 | 84.32 | 90.27 |
| | DiffuseMix | 79.37 | 85.76 | 91.26 |

[5] Tsz-Him Cheung and Dit-Yan Yeung. Adaaug: Learning class- and instance-adaptive data augmentation policies. In International Conference on Learning Representations, 2021, incorporated by reference in its entirety.

[14] K. He, Xiangyu Zhang, Shaoqing Ren, and Jian Sun. Deep residual learning for image recognition. In CVPR, 2016, incorporated by reference in its entirety.

[19] Shaoli Huang, Xinchao Wang, and Dacheng Tao. Snapmix: Semantically proportional mixing for augmenting finegrained data. In Proceedings of the AAAI Conference on Artificial Intelligence, pages 1628-1636, 2021, incorporated by reference in its entirety.

[21] Minsoo Kang and Suhyun Kim. Guidedmixup: an efficient mixup strategy guided by saliency maps. In AAAI, pages 1096-1104, 2023, incorporated by reference in its entirety.

[22] JangHyun Kim, Wonho Choo, Hosan Jeong, and Hyun Oh Song. Co-mixup: Saliency guided joint mixup with supermodular diversity. In International Conference on Learning Representations, 2020, incorporated by reference in its entirety.

[45] Sangdoo Yun, Dongyoon Han, Seong Joon Oh, Sanghyuk Chun, Junsuk Choe, and Youngjoon Yoo. Cutmix: Regularization strategy to train strong classifiers with localizable features. CoRR, abs/1905.04899, 2019, incorporated by reference in its entirety.

[23] Jang-Hyun Kim, Wonho Choo, and Hyun Oh Song. Puzzle mix: Exploiting saliency and local statistics for optimal mixup. In International Conference on Machine Learning, pages 5275-5285. PMLR, 2020, incorporated by reference in its entirety.

To evaluate adaptability in low-resource scenarios, the performance of the system is analyzed in a data scarcity setting. Table 6 presents the Top-1 accuracy of models trained on the Flower102 dataset using only ten randomly selected images per class. ResNet-18 models trained with the system achieve 77.14% accuracy on the validation set and 74.12% on the test set. These results illustrate that the system not only improves performance under limited data but also enhances dataset diversity through conditional prompting.

In certain embodiments, the adaptability of the DiffuseMix augmentation pipeline is further evaluated under data-scarcity conditions, where only a small number of labelled samples per class are available for training. This experiment models real-world situations, such as industrial inspection, agricultural datasets, or medical imaging, where collecting large annotated datasets is often impractical or expensive. To assess this capability, a ResNet-18 model is trained on the Flower102 dataset using only ten randomly selected images per class.

Figure 6D:
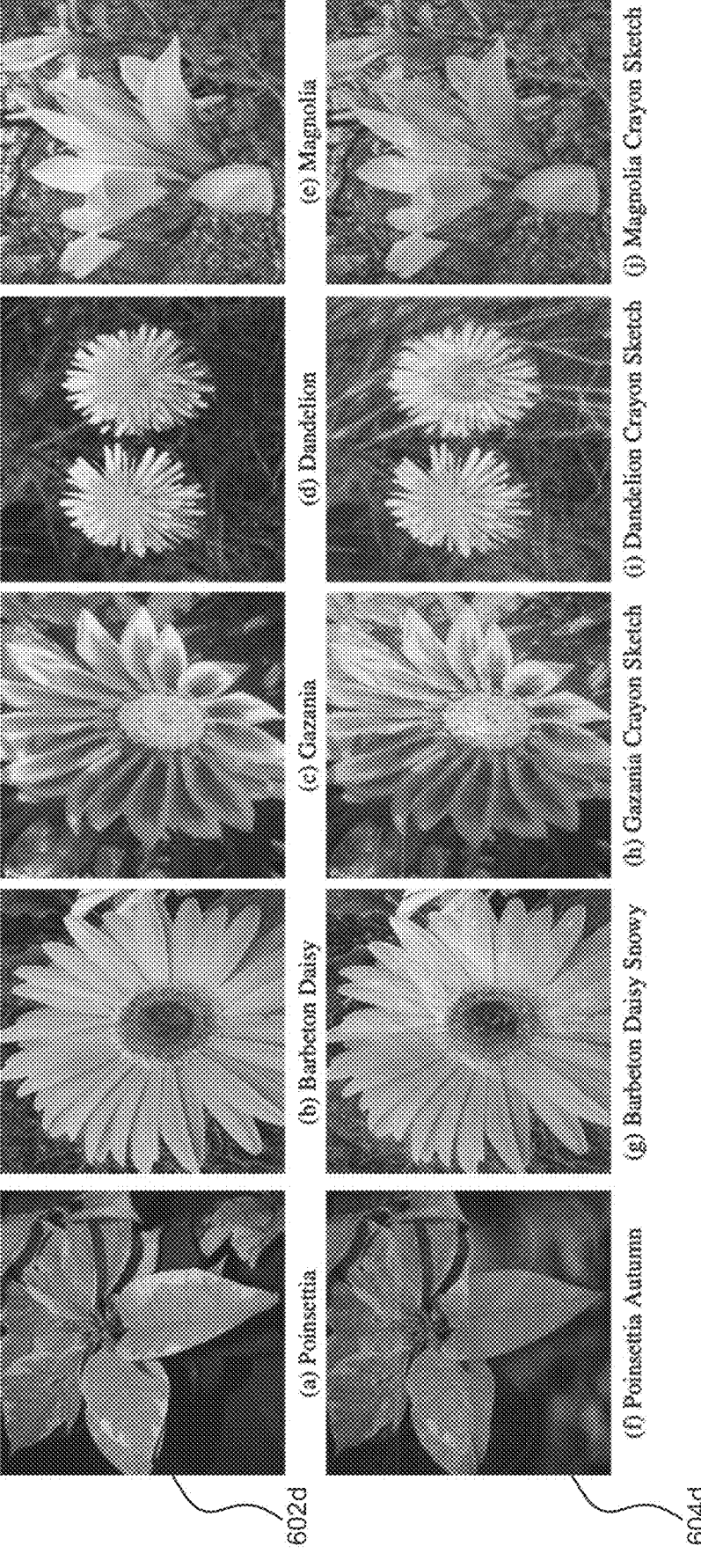
FIG. 6D illustrates original training images and Diffuse-Mix augmented images from the Oxford Flower102 dataset.

FIG. 6D illustrates original training images and Diffuse-Mix augmented images from the Oxford Flower102 dataset. First row 602d showcases original, unaltered images of various flowers, including poinsettia, barbeton daisy, gazania, dandelion, and *Magnolia* classes. Second row 604d illustrates the transformative effects of the DiffuseMix augmentation method. The effects of the custom-tailored prompts-based generation are visible on the generated portion of each image in 604d. Overall, DiffuseMix results in a diverse array of images with sufficient structural complexity and diversity to train robust classifiers.

The extended results from this evaluation are presented in Table 6 below. DiffuseMix achieves the highest accuracy among all compared methods, obtaining 77.14% accuracy on the validation set and 74.12% accuracy on the test set. These values reflect a substantial improvement over conventional mixup-family, patch-composition, and saliency-guided augmentation approaches.

TABLE 6

Top-1 (%) accuracy on data scarcity task of ResNet-18 on Flower102 dataset

| Method | Valid | Test |
|---|---|---|
| Vanilla [14] | 64.48 | 59.14 |
| Mixup [49] | 70.55 | 66.81 |
| CutMix [46] | 62.68 | 58.51 |
| Saliency Mix [41] | 63.23 | 57.45 |
| Guided-SR [21] | 72.84 | 69.31 |
| SnapMix [19] | 65.71 | 59.79 |
| PuzzleMix [23] | 71.56 | 66.71 |
| Co-Mixup [22] | 68.17 | 63.20 |
| GuidedMixup [21] | 74.74 | 70.44 |
| DiffuseMix | 77.14 | 74.12 |

[14] K. He, Xiangyu Zhang, Shaoqing Ren, and Jian Sun. Deep residual learning for image recognition. In CVPR, 2016, incorporated by reference in its entirety.

[19] Shaoli Huang, Xinchao Wang, and Dacheng Tao. Snapmix: Semantically proportional mixing for augmenting finegrained data. In Proceedings of the AAAI Conference on Artificial Intelligence, pages 1628-1636, 2021, incorporated by reference in its entirety.

[21] Minsoo Kang and Suhyun Kim. Guidedmixup: an efficient mixup strategy guided by saliency maps. In AAAI, pages 1096-1104, 2023, incorporated by reference in its entirety.

[22] JangHyun Kim, Wonho Choo, Hosan Jeong, and Hyun Oh Song. Co-mixup: Saliency guided joint mixup with supermodular diversity. In International Conference on Learning Representations, 2020, incorporated by reference in its entirety.

[23] Jang-Hyun Kim, Wonho Choo, and Hyun Oh Song. Puzzle mix: Exploiting saliency and local statistics for optimal mixup. In International Conference on Machine Learning, pages 5275-5285. PMLR, 2020, incorporated by reference in its entirety.

When only ten images per class are available, the baseline (Vanilla) ResNet-18 model achieves 64.48% on the validation set and 59.14% on the test set, showing the difficulty of training under such extreme data limitations. Mixup-family methods such as SnapMix, PuzzleMix and Co-Mixup provide measurable improvements by incorporating spatial mixing or saliency information. PuzzleMix, for example, achieves 71.56% validation and 66.71% test accuracy, while GuidedMixup achieves 74.74% and 70.44%, respectively. These methods improve performance but remain constrained by their dependence on mixing multiple input samples or by introducing spatial distortions that may remove object-specific cues.

DiffuseMix surpasses all of these methods by a considerable margin. Achieving 77.14% validation accuracy and 74.12% test accuracy, DiffuseMix provides the strongest generalisation in the low-data regime. This improvement reflects the complementarity of the three core components of DiffuseMix, which includes diffusion-generated image variations, binary-mask hybrid image formation and fractal-based multi-scale blending.

The diffusion model introduces controlled stylistic changes without removing or distorting the object of interest. This expands dataset diversity despite the limited number of training images and helps the model avoid overfitting to low-entropy visual cues.

The hybrid images expose the classifier to complementary regions of the input images, promoting robustness to spatial occlusion and encouraging the network to learn class-relevant features distributed across the object.

Fractal textures introduce additional structural variation at multiple scales while preserving the underlying content of the image. This enhances robustness to background variation and image complexity without affecting label correctness.

Together, these elements generate a wider and more balanced distribution of augmented images than methods that rely solely on pixel-space mixing or patch-based composition. The proposed system produces augmented samples that retain clear object structure while exploring diverse visual conditions, allowing the classifier to learn strong decision boundaries even when provided with only a few labelled samples.

These results demonstrate that DiffuseMix provides a significant technical advantage in low-resource scenarios. The augmentation pipeline reduces model overfitting, improves robustness to background variations, and enhances representation learning more effectively than conventional mixup, saliency-guided, or patch-composition methods. The DiffuseMix method is particularly effective when only a limited number of labelled examples per class are available, because the three-stage augmentation process such as the diffusion-based style change, mask-based hybridisation and fractal blending, which generates a rich variety of label-preserving samples from a small initial dataset.

An ablation study was conducted to evaluate the impact of individual components within the disclosed augmentation framework using two benchmark datasets, namely Stanford Cars and Flowers-102. The study assessed the contribution of different image combinations, including original input images $I_i$, generated images $I_{ij}$ produced using textual prompts $p_j$, hybrid images $H_{iju}$ formed by concatenating portions of original and generated images using random binary masks Mu, and fractal images Fv blended with hybrid images to produce the final augmented image $A_{ijuv}$ The performance was measured in terms of Top-1 and Top-5 classification accuracies for each dataset. The results, as shown in Table 7, demonstrate that each successive addition of a component leads to consistent performance improvements, thereby validating the effectiveness of the compositional augmentation strategy employed in the proposed system. The hybridization and fractal blending operations were observed to contribute substantially to classification accuracy, particularly when used in combination.

TABLE 7

Ablation study using Stanford Cars
(cars) and Flower102 (Flow) datasets

| | | | | | | | |
|---|---|---|---|---|---|---|---|
| | $I_i$ | ✓ | ✓ | — | — | — | — |
| | $I_{ij}$ | — | — | ✓ | ✓ | — | — |
| | $H_{iju}$ | — | — | — | ✓ | ✓ | ✓ |
| | $F_v$ | — | ✓ | — | ✓ | — | ✓ |
| Cars | Top-1 | 85.52 | 86.73 | 87.63 | 89.42 | 90.59 | 91.26 |
| | Top-5 | 90.34 | 92.38 | 90.23 | 91.57 | 96.73 | 99.96 |
| Flow | Top-1 | 78.73 | 78.34 | 77.38 | 77.81 | 79.22 | 80.20 |
| | Top-5 | 94.38 | 94.91 | 93.15 | 93.24 | 94.38 | 95.40 |

Transfer learning experiments are conducted using ImageNet-pretrained ResNet-50 on the Flower102, Aircraft, and Stanford Cars datasets. As shown in Table 8, the system achieves 98.02% Top-1 accuracy on Flower102, 85.65% on Aircraft, and 93.17% on Stanford Cars, consistently outperforming all other methods. These results highlight the practical significance of the system in fine-tuning scenarios, where computational resources are constrained.

TABLE 8

Top-1 (%) accuracy of the system on fine-tuning
experiments using ImageNet pretrained ResNet-50

| Method | Flower102 | Aircraft | Cars |
|---|---|---|---|
| Vanilla [14] | 94.98 | 81.60 | 88.08 |
| AA [8] | 93.88 | 83.39 | 90.82 |
| RA [9] | 95.23 | 82.98 | 89.28 |
| Fast AA [30] | 96.08 | 82.56 | 89.71 |
| AdaAug [5] | 97.19 | 83.97 | 91.18 |
| DIFFUSEMIX | 98.02 | 85.65 | 93.17 |

[5] Tsz-Him Cheung and Dit-Yan Yeung. Adaaug: Learning class- and instance-adaptive data augmentation policies. In International Conference on Learning Representations, 2021, incorporated by reference in its entirety.
[8] Ekin D. Cubuk, Barret Zoph, Dandelion Mane, Vijay Vasudevan, and Quoc V. Le. Autoaugment: Learning augmentation strategies from data. In CVPR, 2019, incorporated by reference in its entirety.
[9] Ekin D Cubuk, Barret Zoph, Jonathon Shlens, and Quoc V Le. Randaugment: Practical automated data augmentation with a reduced search space. In Proceedings of the IEEE/CVF conference on computer vision and pattern recognition workshops, pages 702-703, 2020, incorporated by reference in its entirety.
[14] K. He, Xiangyu Zhang, Shaoqing Ren, and Jian Sun. Deep residual learning for image recognition. In CVPR, 2016, incorporated by reference in its entirety.
[30] Sungbin Lim, Ildoo Kim, Taesup Kim, Chiheon Kim, and Sungwoong Kim. Fast autoaugment. Advances in Neural Information Processing Systems, 32, 2019, incorporated by reference in its entirety.

An ablation analysis was performed to examine the effect of masking strategies on the performance of the disclosed augmentation method using the Flower102 dataset and a ResNet-50 architecture. The evaluation, as shown in Table 9, considered multiple variants, including the use of vertical masks alone, a combination of vertical and horizontal masks, and an extended configuration incorporating both masks along with random flipping of the positions between original and generated image regions. Each variant of the masking technique yielded notably superior Top-1 and Top-5 classification accuracies compared to the baseline vanilla model. Among the evaluated configurations, the highest performance was achieved when both vertical and horizontal masks were employed in conjunction with the flipping strategy. This outcome highlights the role of diverse masking patterns in enhancing image variation and promoting improved generalization during training.

TABLE 9

Ablation on the effects of masking in the system Flower102 dataset.

| Mask | Top-1 (%) | Top-5 (%) |
|---|---|---|
| Vanilla [14] | 89.74 | 94.38 |
| Ver Mask | 94.02 | 98.42 |
| Hor + Ver Masks | 94.27 | 99.03 |
| Hor + Ver + Flipping | 95.37 | 99.39 |

[14] K. He, Xiangyu Zhang, Shaoqing Ren, and Jian Sun. Deep residual learning for image recognition. In CVPR, 2016. The reference is incorporated herein by reference in its entirety.

In some embodiments, the DiffuseMix augmentation model is evaluated in combination with existing masking-based augmentation techniques, including Mixup and CutMix, to determine whether the diffusion-based and fractal-based components provide additional benefits when applied alongside traditional mixing schemes. To assess this, a set of controlled experiments is conducted on the Flower102 dataset using a ResNet-50 model. Six training configurations are compared: (i) a baseline model trained without special augmentation, (ii) Mixup alone, (iii) CutMix alone, (iv) Mixup combined with DiffuseMix, (v) CutMix combined with DiffuseMix, and (vi) DiffuseMix alone.

The comparative results are summarized in the following table:

TABLE 10

Top-1 accuracy (%) on Flower102 (ResNet-50)

| Method | Top-1 Acc. (%) |
|---|---|
| Vanilla (baseline) | 78.73 |
| Mixup | 79.34 |
| CutMix | 79.22 |
| CutMix + DiffuseMix | 79.58 |
| Mixup + DiffuseMix | 80.20 |
| DiffuseMix (proposed) | 81.30 |

The baseline model achieves 78.73% Top-1 accuracy. Mixup and CutMix provide marginal improvements over the baseline, reaching 79.34% and 79.22% respectively. When DiffuseMix is added to these masking methods, accuracy increases further to 79.58% for CutMix+DiffuseMix and 80.20% for Mixup+DiffuseMix. These increases indicate that the diffusion-generated visual variations and fractal-based structural variations introduced by DiffuseMix offer complementary benefits when used with traditional mixing approaches.

The highest accuracy and performance, however, is achieved when DiffuseMix is applied on its own, producing 81.30% Top-1 accuracy, which is substantially higher than any combination involving CutMix or Mixup. This result shows that DiffuseMix internal hybrid image formation (using the mask $M_u$), together with diffusion-generated images and fractal-blended augmentations controlled by the blending parameter λ, provides a coordinated augmentation effect that is more effective than simple additive combinations of independent augmentation methods. While Mixup and CutMix can offer small additional improvements when combined with DiffuseMix, the best overall performance is obtained when the DiffuseMix model or method is applied in its original form without extra mixing.

These findings highlight that DiffuseMix provides a coordinated augmentation process in which each stage contributes a specific type of controlled variation such as Diffusion-generated variations, which introduce global changes in tone, lighting, or style without removing or distorting the object of interest, hybrid image formation using binary masks $M_{u}$ that allows complementary regions from different source images to be combined in a way that maintains object structure while encouraging spatial robustness and fractal-based blending, which introduces multi-scale textural variations that remain label-preserving, improving robustness to background changes and visual noise.

Conventional methods such as Mixup and CutMix, by contrast, were originally designed as stand-alone pixel-space mixing strategies. When combined with DiffuseMix, they offer incremental gains, but they do not integrate as naturally with the generative and fractal components. The internal hybridisation step of DiffuseMix is tailored to work with its own generative stages, enabling consistent preservation of semantic content.

Accordingly, the experiments show that DiffuseMix is not merely compatible with other augmentation methods, it also surpasses them when used independently. This demonstrates a technical advantage of the proposed DiffuseMix method in scenarios where high accuracy, stable label preservation, and robust generalisation are required.

These fine-grained experiments demonstrate that the DiffuseMix model or pipeline provides improved learning of discriminative details, especially where classes differ by subtle shape, texture or part-level attributes. By generating augmented images that maintain the spatial integrity of the original object while introducing controlled global and textural variations, the system reduces over-fitting and encourages more robust feature learning. This advantage is not achieved by mixup-family methods, which often distort object boundaries, nor by policy-search methods, which may apply transformations that weaken class-consistent characteristics.

Figure 7A:
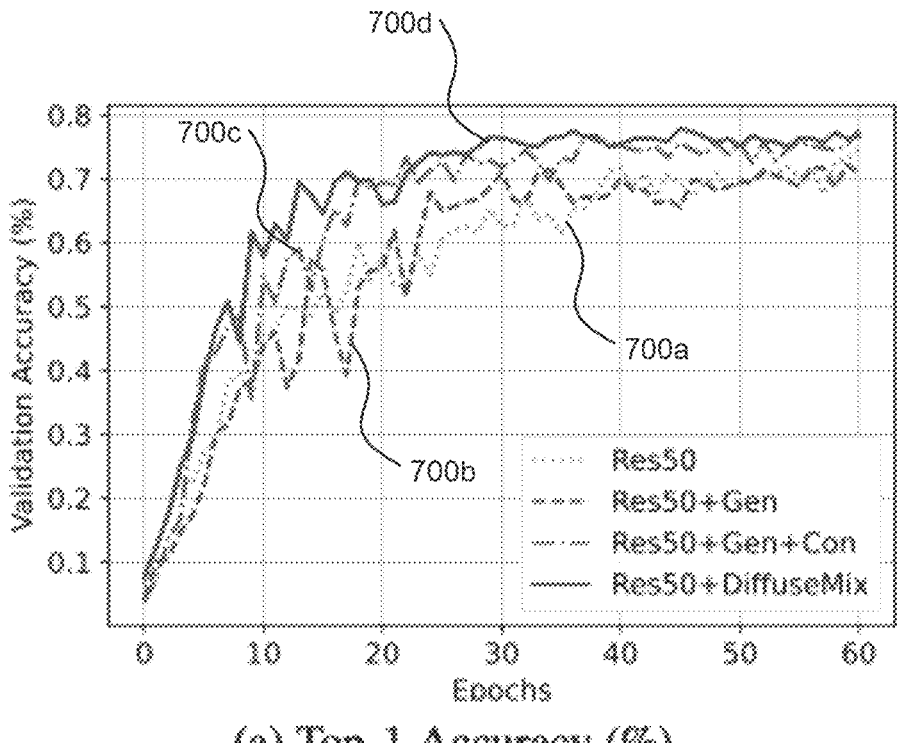
FIG. 7A illustrates validation Top-1 accuracy curves for different augmentation configurations, according to some embodiments of the present disclosure.
Figure 7B:
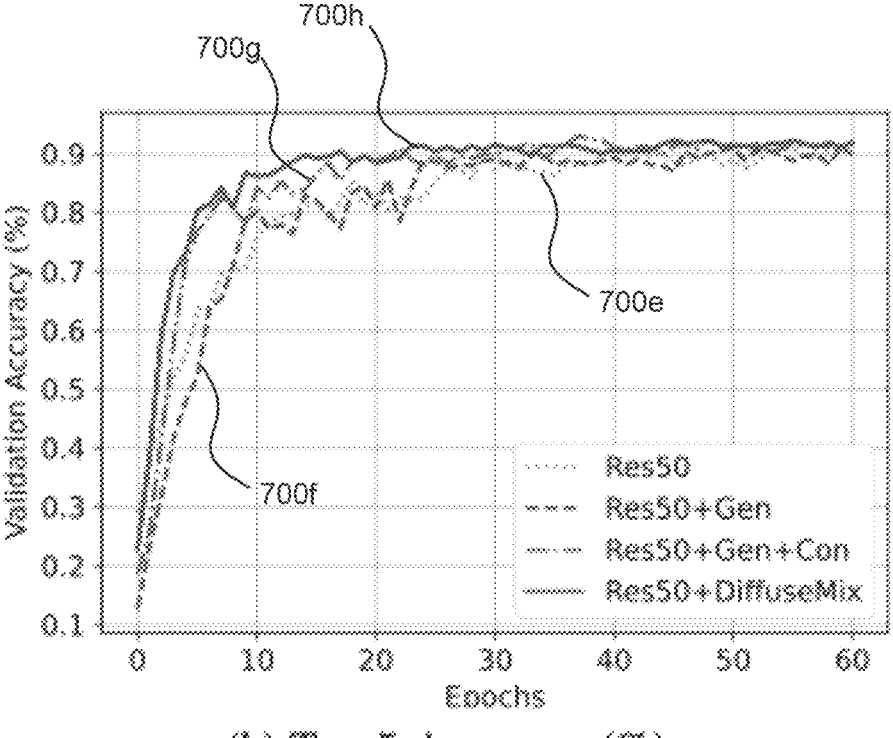
FIG. 7B illustrates validation Top-5 accuracy curves for the different augmentation configurations, according to some embodiments of the present disclosure.
Figure 7C:
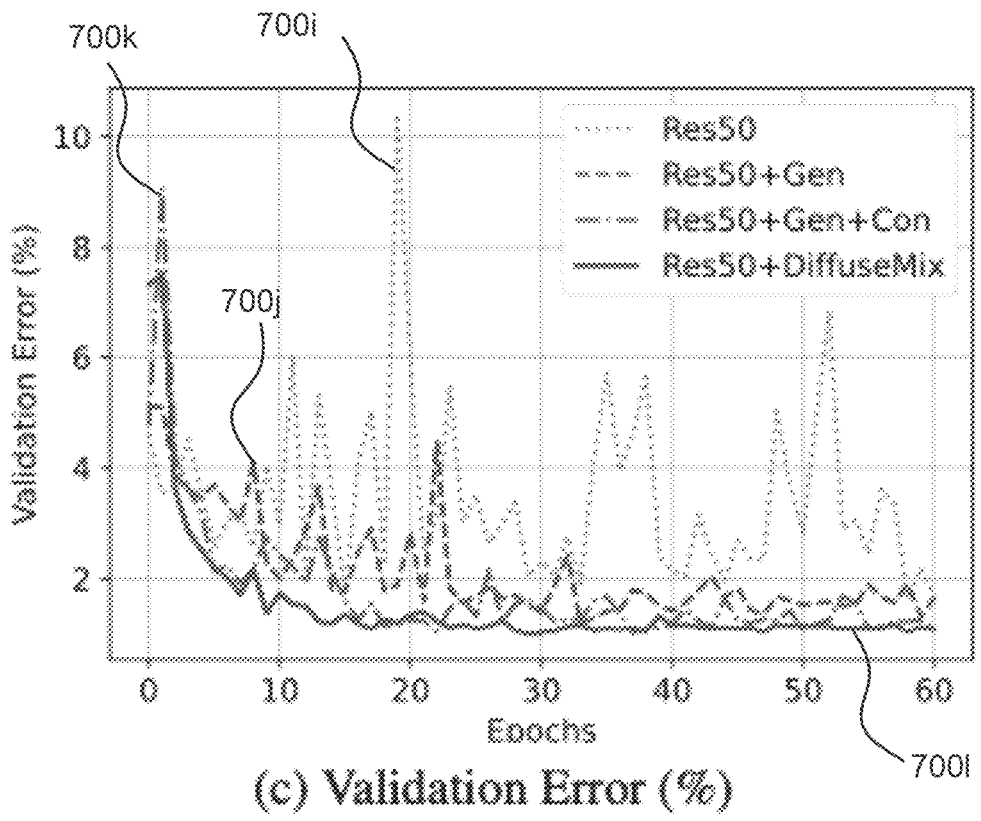
FIG. 7C illustrates validation error curves across training epochs for the different augmentation configurations, according to some embodiments of the present disclosure.

FIG. 7A-7C illustrates the training behavior of several augmentation strategies on the Flower102 dataset using a ResNet-50 model. FIG. 7A shows the Top-1 validation accuracy plotted over 60 training epochs for four configurations: baseline ResNet-50 (curve 700a), ResNet-50 with diffusion-generated images only (curve 700b), ResNet-50 with diffusion-generated images and hybrid-image construction (curve 700c), and ResNet-50 with the full DiffuseMix pipeline (curve 700d). In this experiment, the baseline ResNet-50 configuration (curve 700a) converges at about 76.41% Top-1 validation accuracy, the ResNet-50 with diffusion-generated images only (curve 700b) converges at about 73.96%, the ResNet-50 with diffusion-generated images and hybrid-image construction (curve 700c) converges at about 75.79%, and the full DiffuseMix configuration (curve 700d) converges at about 77.26%. The curve 700d corresponding to DiffuseMix increases steadily during the early epochs and remains consistently higher than the other curves, indicating faster convergence and improved accuracy during the entire training process.

FIG. 7B presents the Top-5 accuracy curves for the same configurations (curves 700e-700h). Similar to FIG. 7A, the DiffuseMix curve 700d maintains a clear lead over the baseline and the partial-pipeline variants, demonstrating that the augmented samples produced by DiffuseMix improve both primary and secondary prediction rankings during training. Overall, the ordering of the curves in FIG. 7B mirrors that of FIG. 7A, with the ResNet-50+DiffuseMix configuration providing the highest Top-5 validation accuracy across the training epochs and at convergence, while the configuration using only diffusion-generated images shows the lowest Top-5 accuracy.

FIG. 7C shows the validation error across epochs for the same four configurations (curves 700i-700l). The DiffuseMix curve 700l exhibits the smoothest decline in validation error and the lowest magnitude of oscillation throughout training. By contrast, the baseline curve 700i starts with a relatively low initial validation loss but begins to fluctuate as training continues, indicating a potential plateau in learning and a limitation in capturing more complex patterns. The curve 700j corresponding to ResNet-50 with diffusion-generated images only and the curve 700k corresponding to ResNet-50 with diffusion-generated images plus hybrid-image construction exhibit intermediate behavior, with larger oscillations and higher final validation error than the ResNet-50+DiffuseMix configuration, i.e. curve 700l. By comparison, the baseline curve 700i shows substantially larger fluctuations, especially in the early and mid-training stages. This smoother trajectory suggests that DiffuseMix provides more stable gradient behavior and reduces overfitting tendencies, leading to more reliable generalisation performance.

Taken together, FIGS. 7A-7C demonstrate that the DiffuseMix augmentation pipeline improves not only the final classification accuracy, but also the training dynamics. The combination of diffusion-generated variations, hybrid image construction and fractal-based blending provides a more stable optimization trajectory, faster convergence and reduced validation error variance. These convergence characteristics, together with the higher final Top-1 and Top-5 accuracies achieved by ResNet-50+DiffuseMix, underscore the importance of each stage of the pipeline, which includes generation, concatenation of original and generated images, and fractal blending, in training more robust classifiers compared with conventional augmentation strategies or partial variants of the pipeline.

The present disclosure introduces a diffusion model-based data augmentation framework designed to enhance image diversity while preserving the semantic content of the original input. Through a structured augmentation pipeline comprising generation, guided concatenation, and fractal blending stages, the system produces semantically coherent yet diverse augmented images that contribute to improved model generalization. Empirical evaluations across a broad spectrum of learning tasks, including general classification, fine-grained classification, data scarcity scenarios, finetuning, and adversarial robustness, demonstrate the superior performance of the system over existing state-of-the-art augmentation techniques. These performance gains have been validated on multiple benchmark datasets including ImageNet-1k, Tiny-ImageNet-200, CIFAR-100, Oxford Flower102, Caltech Birds, Stanford Cars, and FGVC Aircraft. While the method presents two inherent limitations, namely, dependence on prompt quality and computational overhead associated with image generation, these are addressed through the use of generalizable prompt filters and one-time generation with storage strategies. Accordingly, the system represents a scalable, adaptable, and performance-oriented augmentation methodology capable of enhancing training dynamics and convergence behavior in large-scale visual recognition systems.

In the preceding description, specific details have been set forth, such as a particular geometry of a processing system and descriptions of various components and processes used therein. It should be understood, however, that techniques herein may be practiced in other embodiments that depart from these specific details, and that such details are for purposes of explanation and not limitation. Embodiments disclosed herein have been described with reference to the accompanying drawings. Similarly, for purposes of explanation, specific numbers, materials, and configurations have been set forth in order to provide a thorough understanding. Nevertheless, embodiments may be practiced without such specific details. Components having substantially the same functional constructions are denoted by like reference characters, and thus any redundant descriptions may be omitted.

Various techniques have been described as multiple discrete operations to assist in understanding the various embodiments. The order of description should not be construed as to imply that these operations are necessarily order dependent. Indeed, these operations need not be performed in the order of presentation. Operations described may be performed in a different order than the described embodiment. Various additional operations may be performed and/ or described operations may be omitted in additional embodiments.

Those skilled in the art will also understand that there can be many variations made to the operations of the techniques explained above while still achieving the same objectives of the present disclosure. Such variations are intended to be covered by the scope of this disclosure. As such, the foregoing descriptions of embodiments of the invention are not intended to be limiting. Rather, any limitations to embodiments of the invention are presented in the following claims.

The invention claimed is:

1. A data augmentation method, comprising:
   inputting an original image and at least one prompt to a diffusion model to obtain a generated image;
   concatenating a portion of the original image with a portion of the generated image that corresponds to a rest of the original image to form a hybrid image; and
   blending a fractal image into the hybrid image, with a blending factor, to obtain an augmented image,
   wherein the portion of the original image is concatenated with the portion of the generated image using a mask and a pixel-wise multiplication operation, the mask comprises a plurality of pixels that correspond to pixels of the original image and pixels of the generated image, each of the pixels of the mask is either zero or one, the pixel-wise multiplication operation includes multiplying the pixels of the original image with the respective pixels of the mask and multiplying the pixels of the generated image with respective pixels of a complement of the mask, and at least one row or at least one column of the pixels of the mask are all zero.

2. The data augmentation method of claim 1, wherein the at least one prompt includes at least one visual effect selected from the group consisting of watercolor art, rainbow, sunset, aurora, snowy, autumn, ukiyo-e, a sketch with crayon, and mosaic.

3. The data augmentation method of claim 1, wherein the at least one row of the pixels of the mask are all zero.

4. The data augmentation method of claim 3, wherein a half of the columns of the pixels of the mask are all zero.

5. The data augmentation method of claim 1, wherein the at least one column of the pixels of the mask are all zero.

6. The data augmentation method of claim 5, wherein a half of the rows of the pixels of the mask are all zero.

7. The data augmentation method of claim 1, further comprising:
   obtaining the generated image by conditioning the diffusion model to preserve a semantic content of the original image and applying a global visual transformation to the original image.

8. The data augmentation method of claim 1, further comprising:
   training or fine-tuning a deep learning model using the augmented image.

9. A data augmentation system, comprising circuitry configured to:
   receive an original image and at least one prompt to a diffusion model to obtain a generated image;
   concatenate a portion of the original image with a portion of the generated image that corresponds to a rest of the original image to form a hybrid image; and
   blend a fractal image into the hybrid image, with a blending factor, to obtain an augmented image,
   wherein the circuitry is configured to concatenate the portion of the original image with the portion of the generated image using a mask and a pixel-wise multiplication operation, the mask comprises a plurality of pixels that correspond to pixels of the original image and pixels of the generated image, each of the pixels of the mask is either zero or one, the pixel-wise multiplication operation includes multiplying the pixels of the original image with the respective pixels of the mask and multiplying the pixels of the generated image with respective pixels of a complement of the mask, and at least one row or at least one column of the pixels of the mask are all zero.

10. The data augmentation system of claim 9, wherein the at least one prompt includes at least one visual effect selected from the group consisting of watercolor art, rainbow, sunset, aurora, snowy, autumn, ukiyo-e, a sketch with crayon, and mosaic.

11. The data augmentation system of claim 9, wherein the at least one row of the pixels of the mask are all zero.

12. The data augmentation system of claim 11, wherein a half of the columns of the pixels of the mask are all zero.

13. The data augmentation system of claim 9, wherein the at least one column of the pixels of the mask are all zero.

14. The data augmentation system of claim 13, wherein a half of the rows of the pixels of the mask are all zero.

15. The data augmentation system of claim 9, wherein the circuitry is configured to:
   obtain the generated image by conditioning the diffusion model to preserve a semantic content of the original image and applying a global visual transformation to the original image.

16. The data augmentation system of claim 9, wherein the circuitry is configured to train or fine-tune a deep learning model using the augmented image.

* * * * *